US012348299B2

(12) United States Patent
Zhang et al.

(10) Patent No.: US 12,348,299 B2
(45) Date of Patent: Jul. 1, 2025

(54) TECHNIQUES FOR SELECTING BEAMS IN FULL DUPLEX WIRELESS COMMUNICATIONS

(71) Applicant: QUALCOMM Incorporated, San Diego, CA (US)

(72) Inventors: Qian Zhang, Basking Ridge, NJ (US); Yan Zhou, San Diego, CA (US); Navid Abedini, Basking Ridge, NJ (US); Junyi Li, Fairless Hills, PA (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 439 days.

(21) Appl. No.: 17/846,959

(22) Filed: Jun. 22, 2022

(65) Prior Publication Data

US 2023/0421237 A1 Dec. 28, 2023

(51) Int. Cl.
| | |
|---|---|
| *H04L 5/14* | (2006.01) |
| *H04B 7/06* | (2006.01) |
| *H04B 7/08* | (2006.01) |
| *H04B 17/345* | (2015.01) |
| *H04W 16/28* | (2009.01) |
| *H04W 24/08* | (2009.01) |

(52) U.S. Cl.
CPC ........... *H04B 7/088* (2013.01); *H04B 7/0695* (2013.01); *H04B 17/345* (2015.01); *H04W 16/28* (2013.01); *H04W 24/08* (2013.01); *H04L 5/14* (2013.01)

(58) Field of Classification Search
CPC .... H04B 7/088; H04B 7/0695; H04B 17/345; H04W 16/28; H04W 24/08; H04L 5/14
USPC ............................................................ 370/252
See application file for complete search history.

(56) References Cited

U.S. PATENT DOCUMENTS

| | | | |
|---|---|---|---|
| 2021/0329417 A1* | 10/2021 | Priyanto | ................ H04W 64/00 |
| 2021/0351832 A1* | 11/2021 | Zhang et al. | ............ H04B 7/06 |
| 2022/0069884 A1* | 3/2022 | Zhang | ................ H04B 7/06952 |
| 2022/0141852 A1* | 5/2022 | Zhang | ....................... H04L 5/14 |
| | | | 370/329 |
| 2024/0022298 A1* | 1/2024 | Sun | ...................... H04B 7/0626 |

* cited by examiner

*Primary Examiner* — Christopher M Crutchfield
*Assistant Examiner* — Syed Ahmed
(74) *Attorney, Agent, or Firm* — Arent Fox, LLP

(57) ABSTRACT

Aspects described herein relate to receiving, from a network node, a first indication of a set of candidate downlink beams corresponding to multiple downlink beams received from one or more transmit/receive points (TRPs), receiving, from the network node, a second indication of a set of candidate uplink beams of multiple uplink beams, wherein at least one downlink beam in the set of candidate downlink beams includes a downlink beam combination of multiple downlink beams or at least one uplink beam in the set of candidate uplink beams includes an uplink beam combination of multiple uplink beams, and performing beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams.

30 Claims, 12 Drawing Sheets

TECHNIQUES FOR SELECTING BEAMS IN FULL DUPLEX WIRELESS COMMUNICATIONS

FIELD OF THE DISCLOSURE

Aspects of the present disclosure relate generally to wireless communication systems, and more particularly, to techniques for selecting beams for beamforming wireless communications.

DESCRIPTION OF RELATED ART

Wireless communication systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems, and single-carrier frequency division multiple access (SC-FDMA) systems.

These multiple access technologies have been adopted in various telecommunication standards to provide a common protocol that enables different wireless devices to communicate on a municipal, national, regional, and even global level. For example, a fifth generation (5G) wireless communications technology (which can be referred to as 5G new radio (5G NR)) is envisaged to expand and support diverse usage scenarios and applications with respect to current mobile network generations. In an aspect, 5G communications technology can include: enhanced mobile broadband addressing human-centric use cases for access to multimedia content, services and data; ultra-reliable-low latency communications (URLLC) with certain specifications for latency and reliability; and massive machine type communications, which can allow a very large number of connected devices and transmission of a relatively low volume of non-delay-sensitive information.

In some deployments, a device communicating using a wireless communication technologies can use a full duplex (FD) capability where the device can concurrently transmit and receive signals (e.g., using different antenna panels). FD communications may be subject to some level of self-interference where a signal transmitted by the device may also be received at the receiver of the device while the device receives signals from other devices. In addition, in some wireless communication technologies, such as 5G NR, devices can communicate using beams, such that a transmitting device can selectively utilize antenna resources to achieve a beam having a spatial direction toward a receiving device.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

According to an aspect, an apparatus for wireless communication is provided that includes a processor, memory coupled with the processor, and instructions stored in the memory. The instructions are operable, when executed by the processor, to cause the apparatus to receive, from a network node, a first indication of a set of candidate downlink beams corresponding to multiple downlink beams received from one or more transmit/receive points (TRPs), receive, from the network node, a second indication of a set of candidate uplink beams of multiple uplink beams, wherein at least one downlink beam in the set of candidate downlink beams includes a downlink beam combination of multiple downlink beams or at least one uplink beam in the set of candidate uplink beams includes an uplink beam combination of multiple uplink beams, perform beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams, and report, to the network node, a third indication of the set of candidate beam pairs.

In another aspect, an apparatus for wireless communication is provided that includes a processor, memory coupled with the processor, and instructions stored in the memory. The instructions are operable, when executed by the processor, to cause the apparatus to transmit, to a user equipment (UE), a first indication of a set of candidate downlink beams corresponding to multiple downlink beams transmitted from one or more TRPs, transmit, to the UE, a second indication of a set of candidate uplink beams of multiple uplink beams, wherein at least one downlink beam in the set of candidate downlink beams includes a downlink beam combination of multiple downlink beams or at least one uplink beam in the set of candidate uplink beams includes an uplink beam combination of multiple uplink beams, transmit, to the UE, each candidate downlink beam in the set of candidate downlink beams, and receive, from the UE, a third indication of a set of candidate beam pairs based on receiving each candidate downlink beam in the set of candidate downlink beams while transmitting each candidate uplink beam in the set of candidate uplink beams.

In another aspect, a method for wireless communication is provided that includes receiving, from a network node, a first indication of a set of candidate downlink beams corresponding to multiple downlink beams received from one or more TRPs, receiving, from the network node, a second indication of a set of candidate uplink beams of multiple uplink beams, wherein at least one downlink beam in the set of candidate downlink beams includes a downlink beam combination of multiple downlink beams or at least one uplink beam in the set of candidate uplink beams includes an uplink beam combination of multiple uplink beams, performing beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams, and reporting, to the network node, a third indication of the set of candidate beam pairs.

In another aspect, a method for wireless communication at a network node is provided that includes transmitting, to a UE, a first indication of a set of candidate downlink beams corresponding to multiple downlink beams transmitted from one or more TRPs, transmitting, to the UE, a second indication of a set of candidate uplink beams of multiple uplink beams, wherein at least one downlink beam in the set of candidate downlink beams includes a downlink beam combination of multiple downlink beams or at least one uplink beam in the set of candidate uplink beams includes an uplink beam combination of multiple uplink beams, transmitting, to the UE, each candidate downlink beam in the set of candidate downlink beams, and receiving, from the UE, a third indication of a set of candidate beam pairs based on receiving each candidate downlink beam in the set of candidate downlink beams while transmitting each candidate uplink beam in the set of candidate uplink beam.

In a further example, an apparatus for wireless communication is provided that includes a transceiver, a memory configured to store instructions, and one or more processors communicatively coupled with the transceiver and the memory. The one or more processors are configured to execute the instructions to perform the operations of methods described herein. In another aspect, an apparatus for wireless communication is provided that includes means for performing the operations of methods described herein. In yet another aspect, a computer-readable medium is provided including code executable by one or more processors to perform the operations of methods described herein.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

Figure 1:
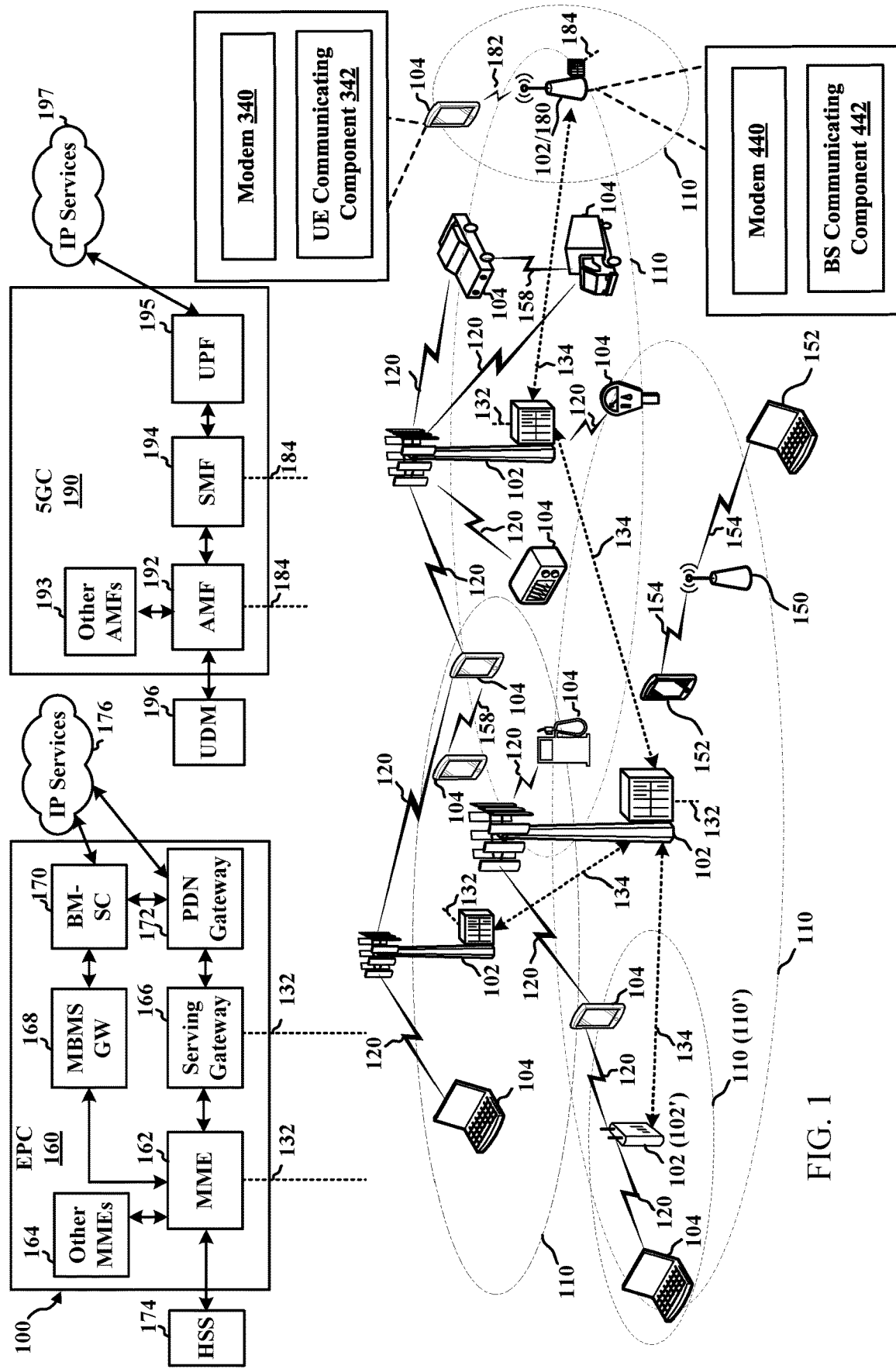
FIG. 1 illustrates an example of a wireless communication system, in accordance with various aspects of the present disclosure.

Various aspects are now described with reference to the drawings. In the following description, for purposes of explanation, numerous specific details are set forth in order to provide a thorough understanding of one or more aspects. It may be evident, however, that such aspect(s) may be practiced without these specific details.

The described features generally relate to selecting beams for full duplex (FD) wireless communication. In some wireless communication technologies, such as fifth generation (5G) new radio (NR), devices can be capable of FD communications such that simultaneous uplink and downlink transmission between a user equipment (UE) and network node (e.g., base station, gNB, etc.) can occur and be successfully processed at both nodes. In an example, FD capability can be present at either the network node or UE or both. For instance, a UE can transmit uplink communications from one antenna panel and can concurrently receive downlink communications at another antenna panel. In another example, a network node can receive uplink communications at one antenna panel and can concurrently transmit downlink communications from another panel. In some examples, FD capability can be conditional on beam separation to mitigate or lessen self-interference at a given node between the uplink and downlink communications. Self-interference may be prevalent when a beam used for transmitting signals is in a direction of a receiving antenna panel of the same device, when beams having a similar direction are used for both transmitting and receiving, where clutter echo may be present, etc.

Using FD communications can facilitate increased uplink duty cycle leading to latency reduction, e.g., it is possible to receive downlink signal in uplink only slots, which can enable latency savings, and/or uplink coverage improvement. FD communications can also enhance system capacity, resource utilization, spectrum efficiency, etc. FD communications can also enable flexible and dynamic uplink/downlink resource adaption according to uplink/downlink traffic in a robust manner. FD communications can also provide some solutions to basic dynamic time domain duplexing (TDD) challenges.

In some examples, a UE can concurrently communicate with multiple transmission/reception points (TRPs), where the multiple TRPs may be configured to communicate with one another over a non-ideal backhaul. Thus, in some examples, a UE with FD capability can concurrently receive downlink communications from a first TRP while transmitting uplink communications to a second TRP. Similarly, in an example, a TRP with FD capability can concurrently transmit downlink communications to a first UE while receiving uplink communications from a second UE. In yet another example, a UE and TRP both with FD capability can concurrently transmit and receive communications with one another. Deploying TRPs and/or UEs with FD capability can result in various self-interference models.

Self-interference (SI) may be caused by a transmitted signal being leaked to an antenna port for receiving signals, or may be caused where a transmitted signal is reflected by an object back towards the antenna port for receiving signals (referred to as clutter echo). SI (especially clutter echo) can be reduced by spatial isolation—by properly choosing transmit and receive beams for a device to use for wireless communications. In some examples, whether or not FD capability is supported (or to enable or enhance FD) can be based on SI measurements (SIM). For example, while the device is sending a signal from a first antenna panel or set of antennas (on one or more transmit beam directions), it can measure the received signal (reflected or leaked transmit signal) on a second antenna panel or set of antennas (on one or more receive beam directions). Additionally, the nodes can be configured for multiple-input multiple-output (MIMO) communications where a UE can communicate with multiple TRPs, and/or a TRP can communicate with multiple UEs, as described. Aspects described herein relate to multi-downlink and/or multi-uplink beams, MIMO SIM considerations, and beam pair selection for FD operation.

In some aspects, a UE can select a set of candidate downlink beams and a network node can select a set of candidate uplink beams, where at least one downlink beam in the set of candidate downlink beams can include a downlink beam combination of multiple downlink beams (also referred to as a multi-downlink beam) or at least one uplink beam in the set of candidate uplink beams can include an uplink beam combination of multiple uplink beams (also referred to as a multi-uplink beam). The UE can perform beam pair measurements for each of the candidate downlink beams received using each of the candidate uplink beams and can report a set of candidate beam pairs to the network node. The network node can select, from the set of candidate beam pairs, the beam pair to be used by the UE for wireless communications. Considering beam combinations in evaluating beams for SI can improve beamforming for MIMO FD wireless communications. In some examples, beam pairs having low SI can be selected for communications, where one or more beams in the beam pair may be a beam combination of multiple beams (referred to as a multi-beam) for MIMO communications.

The described features will be presented in more detail below with reference to FIGS. 1-12.

As used in this application, the terms "component," "module," "system" and the like are intended to include a computer-related entity, such as but not limited to hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets, such as data from one component interacting with another component in a local system, distributed system, and/or across a network such as the Internet with other systems by way of the signal.

Techniques described herein may be used for various wireless communication systems such as CDMA, TDMA, FDMA, OFDMA, single carrier-FDMA, and other systems. The terms "system" and "network" may often be used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM™, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies, including cellular (e.g., LTE) communications over a shared radio frequency spectrum band. The description below, however, describes an LTE/LTE-A system for purposes of example, and LTE terminology is used in much of the description below, although the techniques are applicable beyond LTE/LTE-A applications (e.g., to fifth generation (5G) new radio (NR) networks or other next generation communication systems).

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in other examples.

Various aspects or features will be presented in terms of systems that can include a number of devices, components, modules, and the like. It is to be understood and appreciated that the various systems can include additional devices, components, modules, etc. and/or may not include all of the devices, components, modules etc. discussed in connection with the figures. A combination of these approaches can also be used.

FIG. 1 is a diagram illustrating an example of a wireless communications system and an access network 100. The wireless communications system (also referred to as a wireless wide area network (WWAN)) can include base stations 102, UEs 104, an Evolved Packet Core (EPC) 160, and/or a 5G Core (5GC) 190. The base stations 102 may include macro cells (high power cellular base station) and/or small cells (low power cellular base station). The macro cells can include base stations. The small cells can include femtocells, picocells, and microcells. In an example, the base stations 102 may also include gNBs 180, as described further herein. In one example, some nodes of the wireless communication system may have a modem 340 and UE communicating component 342 for reporting candidate uplink/downlink beam pairs where one or more beams of one or more beam pairs may be a multi-beam, in accordance with aspects described herein. In addition, some nodes may have a modem 440 and BS communicating component 442 for configuring a UE for reporting candidate uplink/downlink beam pairs where one or more beams of one or more beam pairs may be a multi-beam, in accordance with aspects described herein. Though a UE 104 is shown as having the modem 340 and UE communicating component 342 and a base station 102/gNB 180 is shown as having the modem 440 and BS communicating component 442, this is one illustrative example, and substantially any node or type of node may include a modem 340 and UE communicating component 342 and/or a modem 440 and BS communicating component 442 for providing corresponding functionalities described herein.

The base stations 102 configured for 4G LTE (which can collectively be referred to as Evolved Universal Mobile Telecommunications System (UMTS) Terrestrial Radio Access Network (E-UTRAN)) may interface with the EPC 160 through backhaul links 132 (e.g., using an S1 interface). The base stations 102 configured for 5G NR (which can collectively be referred to as Next Generation RAN (NG-RAN)) may interface with 5GC 190 through backhaul links 184. In addition to other functions, the base stations 102 may perform one or more of the following functions: transfer of user data, radio channel ciphering and deciphering, integrity protection, head compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or 5GC 190) with each other over backhaul links 134 (e.g., using an X2 interface). The backhaul links 134 may be wired or wireless.

The base stations 102 may wirelessly communicate with one or more UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macro cells may be referred to as a heterogeneous network. A heterogeneous network may also include Home Evolved Node Bs (eNBs) (HeNBs), which may provide service to a restricted group, which can be referred to as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (e.g., for x component carriers) used for transmission in the DL and/or the UL direction. The carriers may or may not be adjacent to each other. Allocation of carriers may be asymmetric with respect to DL and UL (e.g., more or less carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

In another example, certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same 5 GHz unlicensed frequency spectrum as used by the Wi-Fi AP 150. The small cell 102', employing NR in an unlicensed frequency spectrum, may boost coverage to and/or increase capacity of the access network.

A base station 102, whether a small cell 102' or a large cell (e.g., macro base station), may include an eNB, gNodeB (gNB), or other type of base station. Some base stations, such as gNB 180 may operate in a traditional sub 6 GHz spectrum, in millimeter wave (mmW) frequencies, and/or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band has extremely high path loss and a short range. The mmW base station 180 may utilize beamforming 182 with the UE 104 to compensate for the extremely high path loss and short range. A base station 102 referred to herein can include a gNB 180.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The 5GC 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 can be a control node that processes the signaling between the UEs 104 and the 5GC 190. Generally, the AMF 192 can provide QoS flow and session management. User Internet protocol (IP) packets (e.g., from one or more UEs 104) can be transferred through the UPF 195. The UPF 195 can provide UE IP address allocation for one or more UEs, as well as other functions. The UPF 195 is connected to the IP Services 197. The IP Services 197 may include the Internet, an intranet, an IP Multimedia Subsystem (IMS), a PS Streaming Service, and/or other IP services.

The base station may also be referred to as a gNB, Node B, evolved Node B (eNB), an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or 5GC 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). IoT UEs may include machine type communication (MTC)/enhanced MTC (eMTC, also referred to as category (CAT)-M, Cat M1) UEs, NB-IoT (also referred to as CAT NB1) UEs, as well as other types of UEs. In the present disclosure, eMTC and NB-IoT may refer to future technologies that may evolve from or may be based on these technologies. For example, eMTC may include FeMTC (further eMTC), eFeMTC (enhanced further eMTC), mMTC (massive MTC), etc., and NB-IoT may include eNB-IoT (enhanced NB-IoT), FeNB-IoT (further enhanced NB-IoT), etc. The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Deployment of communication systems, such as 5G new radio (NR) systems, may be arranged in multiple manners with various components or constituent parts. In a 5G NR system, or network, a network node, a network entity, a mobility element of a network, a radio access network (RAN) node, a core network node, a network element, or a network equipment, such as a base station (BS, e.g., BS 102), or one or more units (or one or more components) performing base station functionality, may be implemented in an aggregated or disaggregated architecture. For example, a BS (such as a Node B (NB), evolved NB (eNB), NR BS, 5G NB, access point (AP), a transmit receive point (TRP), or a cell, etc.) may be implemented as an aggregated base station (also known as a standalone BS or a monolithic BS) or a disaggregated base station.

An aggregated base station may be configured to utilize a radio protocol stack that is physically or logically integrated within a single RAN node. A disaggregated base station may be configured to utilize a protocol stack that is physically or logically distributed among two or more units (such as one or more central or centralized units (CUs), one or more distributed units (DUs), or one or more radio units (RUs)). In some aspects, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU and RU also can be implemented as virtual units, i.e., a virtual central unit (VCU), a virtual distributed unit (VDU), or a virtual radio unit (VRU).

Base station-type operation or network design may consider aggregation characteristics of base station functionality. For example, disaggregated base stations may be utilized in an integrated access backhaul (IAB) network, an open radio access network (O-RAN (such as the network configuration sponsored by the O-RAN Alliance)), or a virtualized radio access network (vRAN, also known as a cloud radio access network (C-RAN)). Disaggregation may include distributing functionality across two or more units at various physical locations, as well as distributing functionality for at least one unit virtually, which can enable flexibility in network design. The various units of the disaggregated base station, or disaggregated RAN architecture, can be configured for wired or wireless communication with at least one other unit.

In an example, UE communicating component 342 can measure downlink beams received from multiple TRPs using a set of candidate uplink beams to determine a set of candidate beam pairs, where one or more of the downlink beams can be a multi-downlink beam and/or one or more of the uplink beams can be a multi-uplink beam. UE communicating component 342 can measure downlink beams to determine a set of candidate downlink beams for reporting to a base station 102. BS communicating component 442 can determine a set of candidate uplink beams for reporting to the UE 104. UE communicating component 342 can perform measurements of the set of candidate downlink beams received using the set of candidate uplink beams, and can report a set of candidate beam pairs to the base station 102 based on the measurements. BS communicating component 442 can select the beam pair for the UE 104 to utilize in wireless communications and/or can indicate the beam pair to the UE 104.

Figure 2:
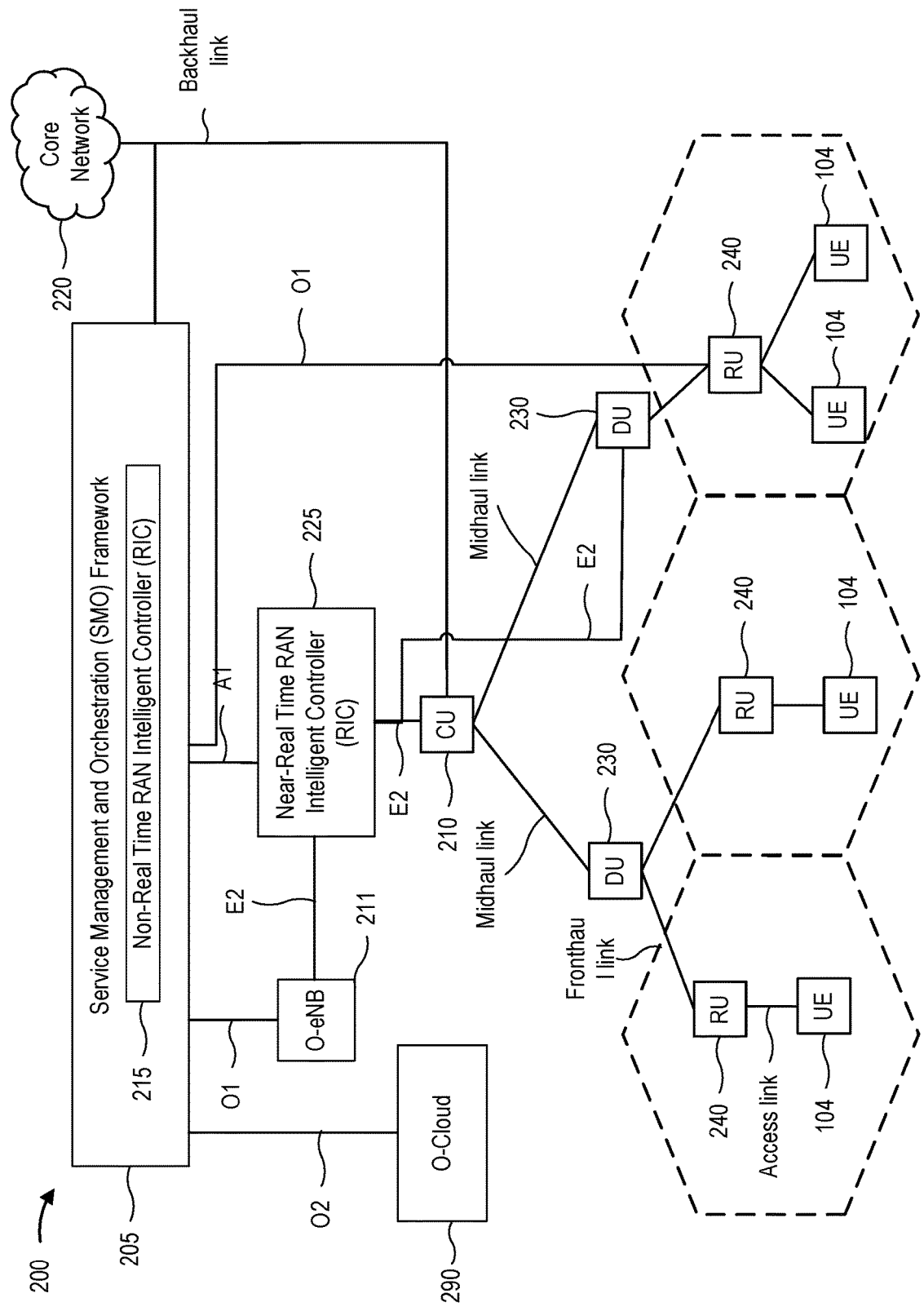
FIG. 2 is a diagram illustrating an example of disaggregated base station architecture, in accordance with various aspects of the present disclosure.

FIG. 2 shows a diagram illustrating an example of disaggregated base station 200 architecture. The disaggregated base station 200 architecture may include one or more central units (CUs) 210 that can communicate directly with a core network 220 via a backhaul link, or indirectly with the core network 220 through one or more disaggregated base station units (such as a Near-Real Time (Near-RT) RAN Intelligent Controller (RIC) 225 via an E2 link, or a Non-Real Time (Non-RT) RIC 215 associated with a Service Management and Orchestration (SMO) Framework 205, or both). A CU 210 may communicate with one or more distributed units (DUs) 230 via respective midhaul links, such as an F1 interface. The DUs 230 may communicate with one or more radio units (RUs) 240 via respective fronthaul links. The RUs 240 may communicate with respective UEs 104 via one or more radio frequency (RF) access links. In some implementations, the UE 104 may be simultaneously served by multiple RUs 240.

Each of the units, e.g., the CUs 210, the DUs 230, the RUs 240, as well as the Near-RT RICs 225, the Non-RT RICs 215 and the SMO Framework 205, may include one or more interfaces or be coupled to one or more interfaces configured to receive or transmit signals, data, or information (collectively, signals) via a wired or wireless transmission medium. Each of the units, or an associated processor or controller providing instructions to the communication interfaces of the units, can be configured to communicate with one or more of the other units via the transmission medium. For example, the units can include a wired interface configured to receive or transmit signals over a wired transmission medium to one or more of the other units. Additionally, the units can include a wireless interface, which may include a receiver, a transmitter or transceiver (such as a radio frequency (RF) transceiver), configured to receive or transmit signals, or both, over a wireless transmission medium to one or more of the other units.

In some aspects, the CU 210 may host one or more higher layer control functions. Such control functions can include radio resource control (RRC), packet data convergence protocol (PDCP), service data adaptation protocol (SDAP), or the like. Each control function can be implemented with an interface configured to communicate signals with other control functions hosted by the CU 210. The CU 210 may be configured to handle user plane functionality (i.e., Central Unit-User Plane (CU-UP)), control plane functionality (i.e., Central Unit-Control Plane (CU-CP)), or a combination thereof. In some implementations, the CU 210 can be logically split into one or more CU-UP units and one or more CU-CP units. The CU-UP unit can communicate bidirectionally with the CU-CP unit via an interface, such as the E1 interface when implemented in an O-RAN configuration. The CU 210 can be implemented to communicate with the DU 230, as necessary, for network control and signaling.

The DU 230 may correspond to a logical unit that includes one or more base station functions to control the operation of one or more RUs 240. In some aspects, the DU 230 may host one or more of a radio link control (RLC) layer, a medium access control (MAC) layer, and one or more high physical (PHY) layers (such as modules for forward error correction (FEC) encoding and decoding, scrambling, modulation and demodulation, or the like) depending, at least in part, on a functional split, such as those defined by the third Generation Partnership Project (3GPP). In some aspects, the DU 230 may further host one or more low PHY layers. Each layer (or module) can be implemented with an interface configured to communicate signals with other layers (and modules) hosted by the DU 230, or with the control functions hosted by the CU 210.

Lower-layer functionality can be implemented by one or more RUs 240. In some deployments, an RU 240, controlled by a DU 230, may correspond to a logical node that hosts RF processing functions, or low-PHY layer functions (such as performing fast Fourier transform (FFT), inverse FFT (iFFT), digital beamforming, physical random access channel (PRACH) extraction and filtering, or the like), or both, based at least in part on the functional split, such as a lower layer functional split. In such an architecture, the RU(s) 240 can be implemented to handle over the air (OTA) communication with one or more UEs 104. In some implementations, real-time and non-real-time aspects of control and user plane communication with the RU(s) 240 can be controlled by the corresponding DU 230. In some scenarios, this configuration can enable the DU(s) 230 and the CU 210 to be implemented in a cloud-based RAN architecture, such as a vRAN architecture.

The SMO Framework 205 may be configured to support RAN deployment and provisioning of non-virtualized and virtualized network elements. For non-virtualized network elements, the SMO Framework 205 may be configured to support the deployment of dedicated physical resources for RAN coverage requirements which may be managed via an operations and maintenance interface (such as an O1 interface). For virtualized network elements, the SMO Framework 205 may be configured to interact with a cloud computing platform (such as an open cloud (O-Cloud) 290) to perform network element life cycle management (such as to instantiate virtualized network elements) via a cloud computing platform interface (such as an O2 interface). Such virtualized network elements can include, but are not limited to, CUs 210, DUs 230, RUs 240 and Near-RT RICs 225. In some implementations, the SMO Framework 205 can communicate with a hardware aspect of a 4G RAN, such as an open eNB (O-eNB) 211, via an O1 interface. Additionally, in some implementations, the SMO Framework 205 can communicate directly with one or more RUs 240 via an O1 interface. The SMO Framework 205 also may include a Non-RT RIC 215 configured to support functionality of the SMO Framework 205.

The Non-RT RIC 215 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 225. The Non-RT RIC 215 may be coupled to or communicate with (such as via an A1 interface) the Near-RT RIC 225. The Near-RT RIC 225 may be configured to include a logical function that enables near-real-time control and optimization of RAN elements and resources via data collection and actions over an interface (such as via an E2 interface) connecting one or more CUs 210, one or more DUs 230, or both, as well as an O-eNB, with the Near-RT RIC 225.

In some implementations, to generate AI/ML models to be deployed in the Near-RT RIC 225, the Non-RT RIC 215 may receive parameters or external enrichment information from external servers. Such information may be utilized by the Near-RT RIC 225 and may be received at the SMO Framework 205 or the Non-RT RIC 215 from non-network data sources or from network functions. In some examples, the Non-RT RIC 215 or the Near-RT RIC 225 may be configured to tune RAN behavior or performance.

For example, the Non-RT RIC 215 may monitor long-term trends and patterns for performance and employ AI/ML models to perform corrective actions through the SMO Framework 205 (such as reconfiguration via O1) or via creation of RAN management policies (such as A1 policies).

In an example, BS communicating component 442, as described herein, can be at least partially implemented within a CU 210, and can transmit the one or more alignment parameters to one or more DUs 230. In this example, the one or more DUs 230 can configure the UE 104 with the alignment parameters for receiving the transmission burst in CDRX mode. In another example, BS communicating component 442, as described herein, can be at least partially implemented within a DU 230, and can transmit the one or more alignment parameters to one or more RUs 240. In this example, the one or more RUs 240 can configure the UE 104 with the alignment parameters for receiving the transmission burst in CDRX mode.

Figure 4:
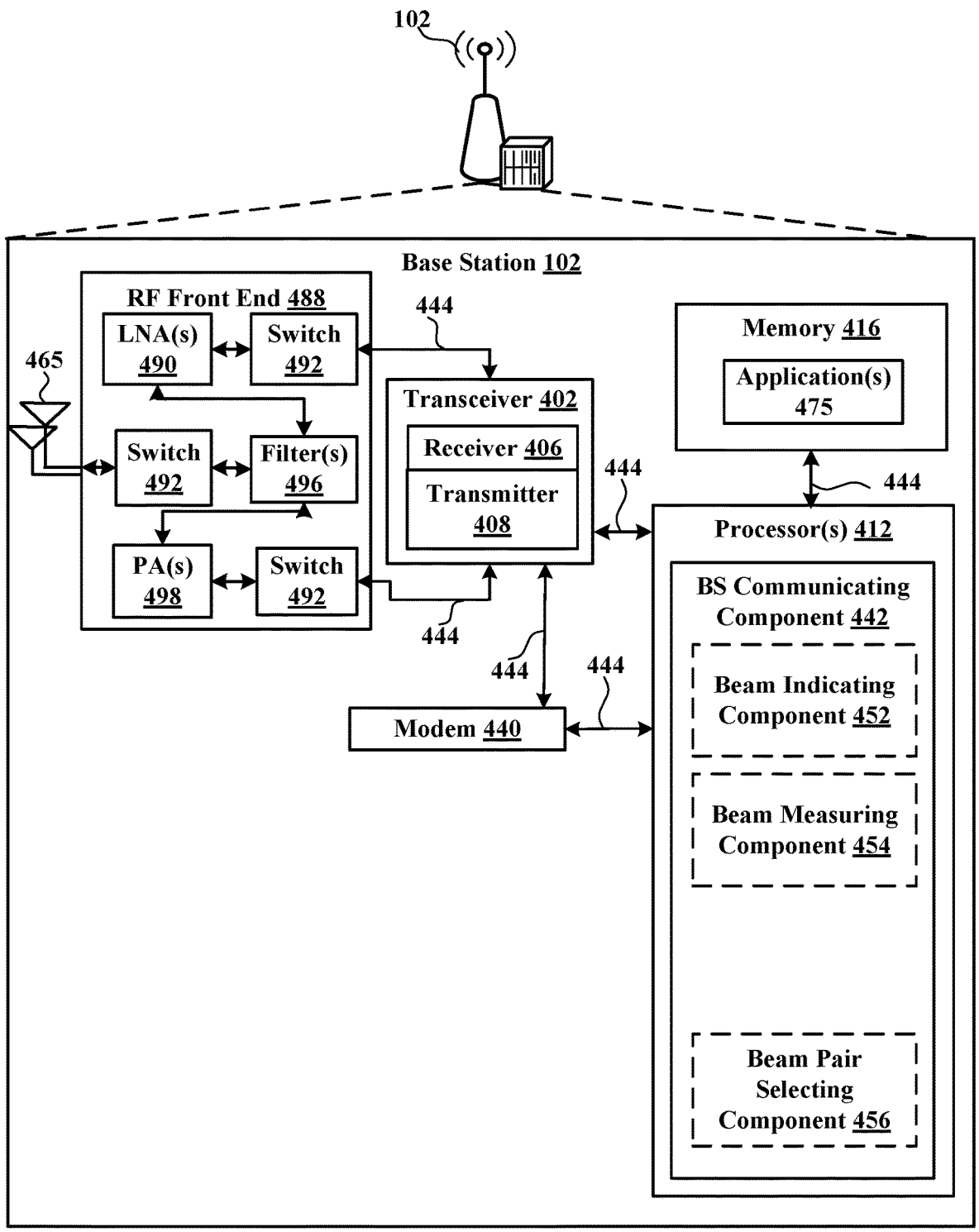
FIG. 4 is a block diagram illustrating an example of a base station, in accordance with various aspects of the present disclosure.
Figure 5:
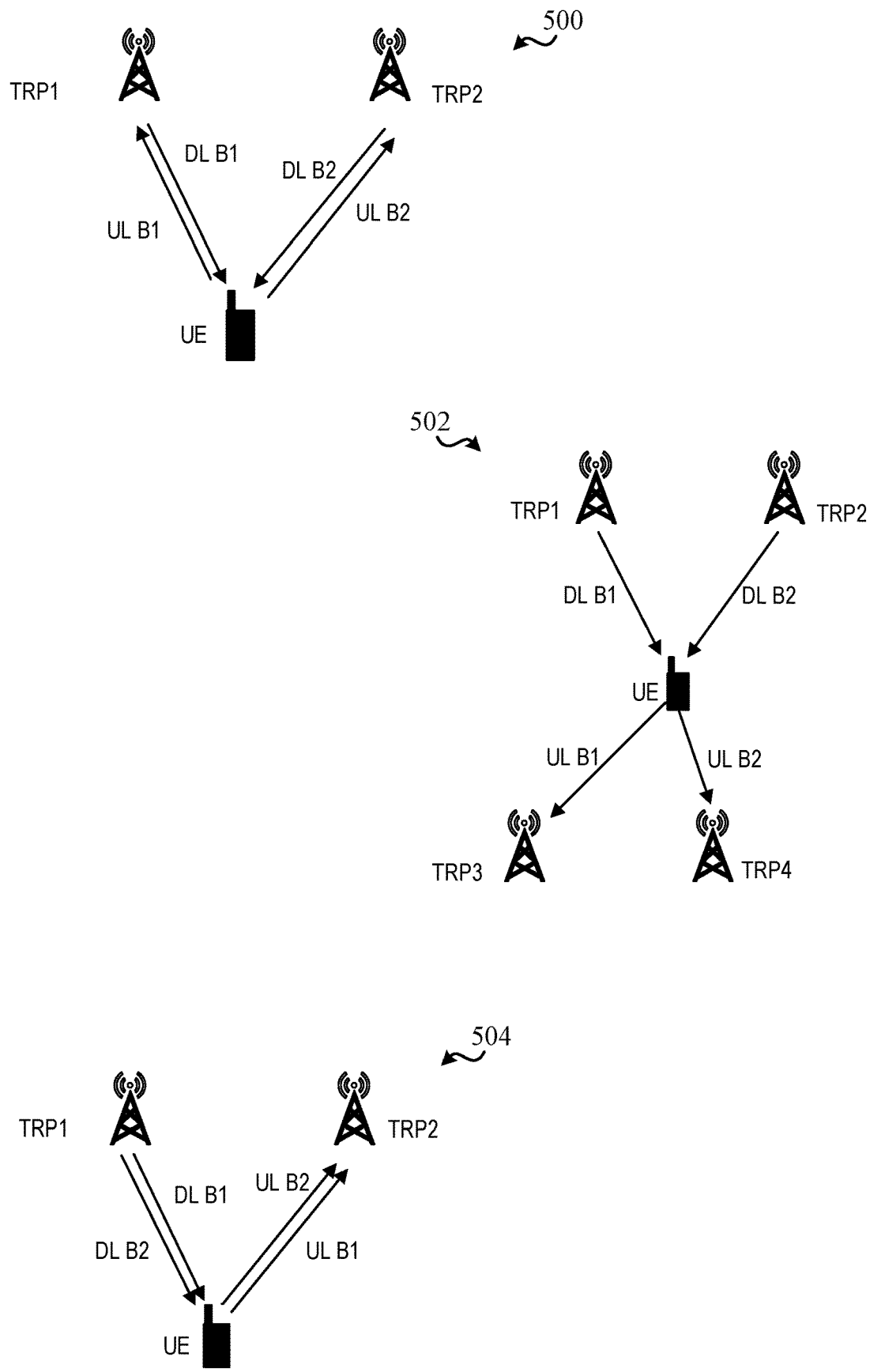
FIG. 5 illustrates examples of full duplex (FD) deployments, in accordance with aspects described herein.
Figure 6:
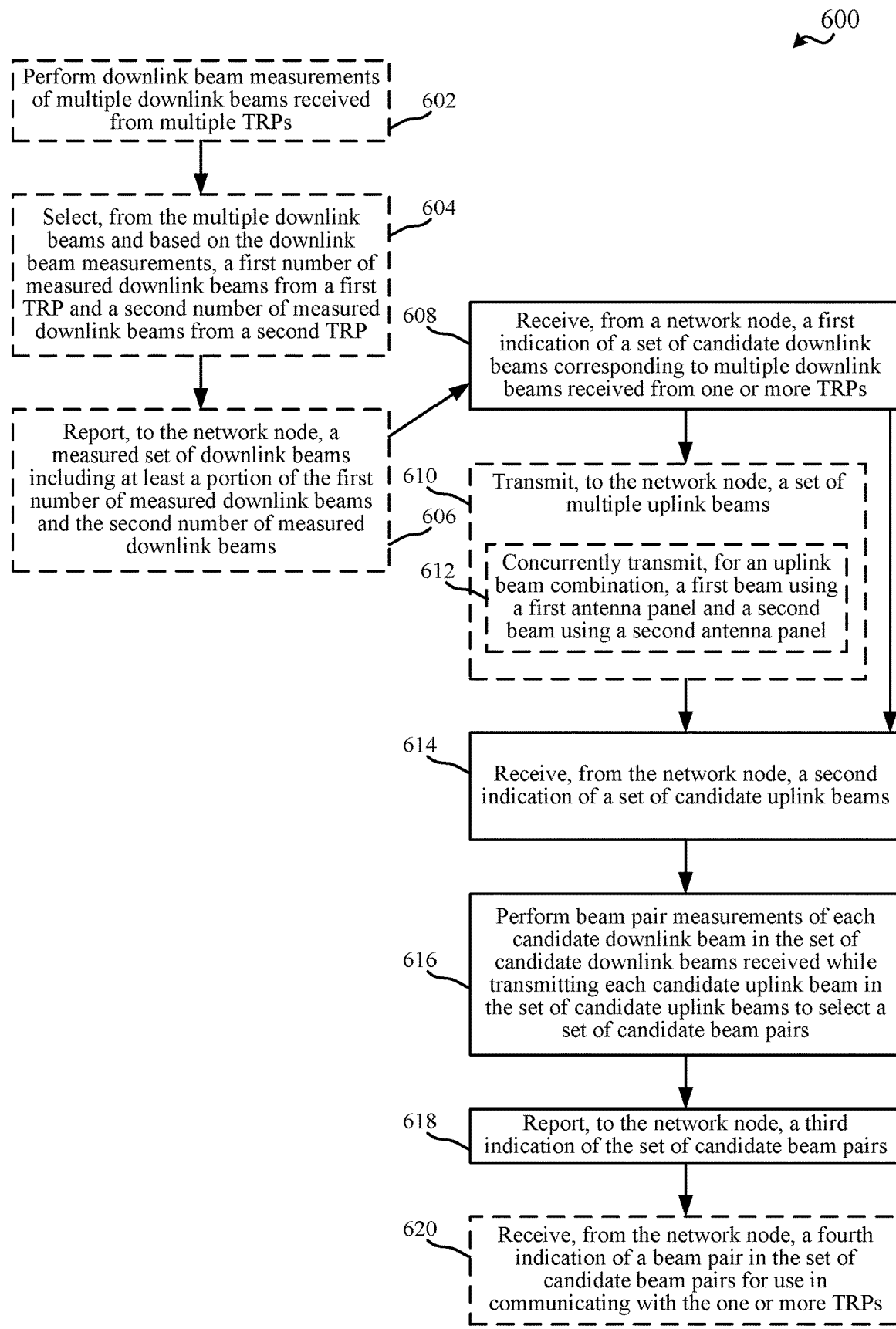
FIG. 6 is a flow chart illustrating an example of a method for reporting a set of candidate beam pairs for use in communicating with one or more transmission/reception points (TRPs), in accordance with aspects described herein.
Figure 7:
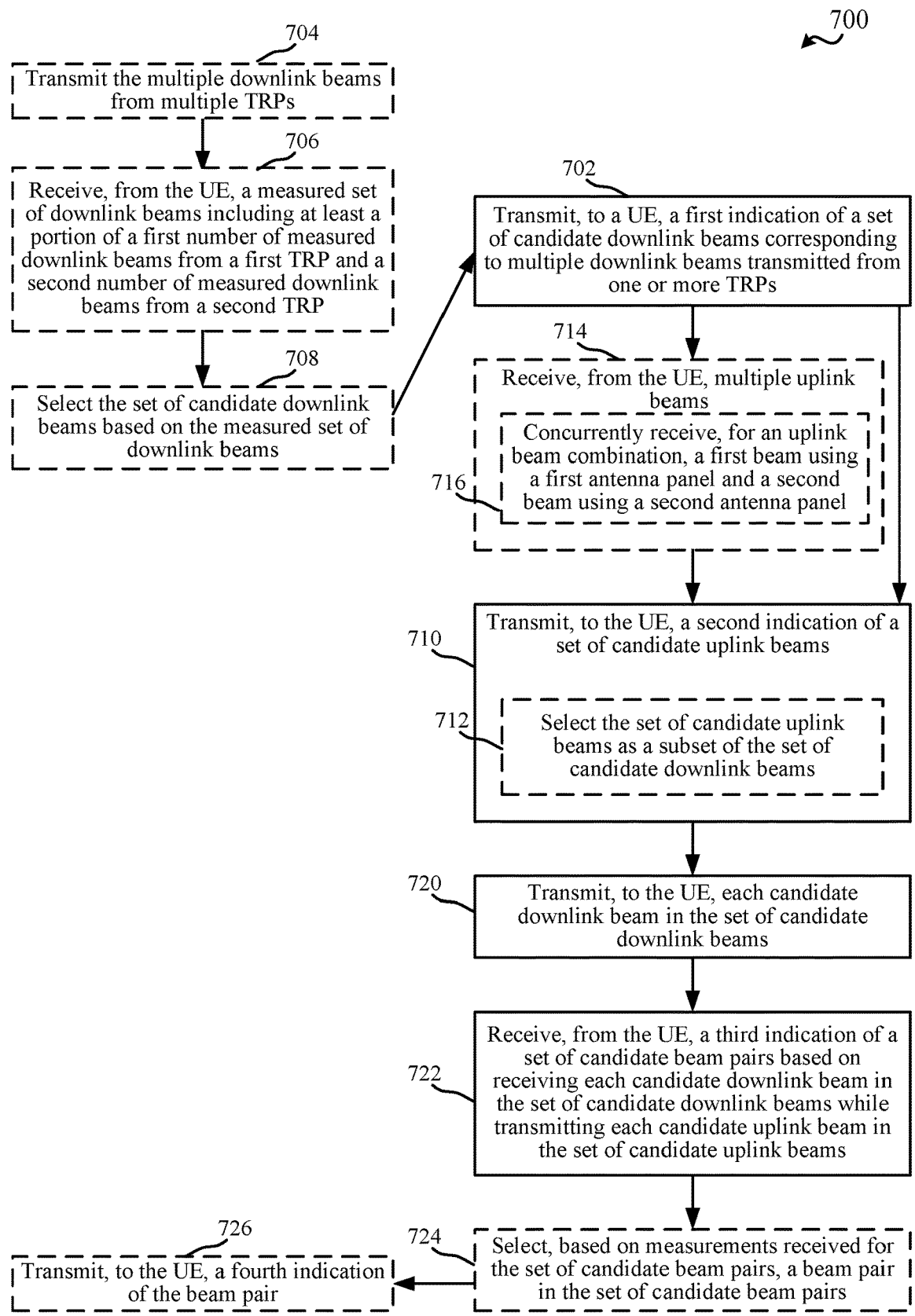
FIG. 7 is a flow chart illustrating an example of a method for configuring a UE to report a set of candidate beam pairs for use in communicating with one or more TRPs, in accordance with aspects described herein.

Turning now to FIGS. 3-12, aspects are depicted with reference to one or more components and one or more methods that may perform the actions or operations described herein, where aspects in dashed line may be optional. Although the operations described below in FIGS. 6 and 7 are presented in a particular order and/or as being performed by an example component, it should be understood that the ordering of the actions and the components performing the actions may be varied, depending on the implementation. Moreover, it should be understood that the following actions, functions, and/or described components may be performed by a specially programmed processor, a processor executing specially programmed software or computer-readable media, or by any other combination of a hardware component and/or a software component capable of performing the described actions or functions.

Figure 3:
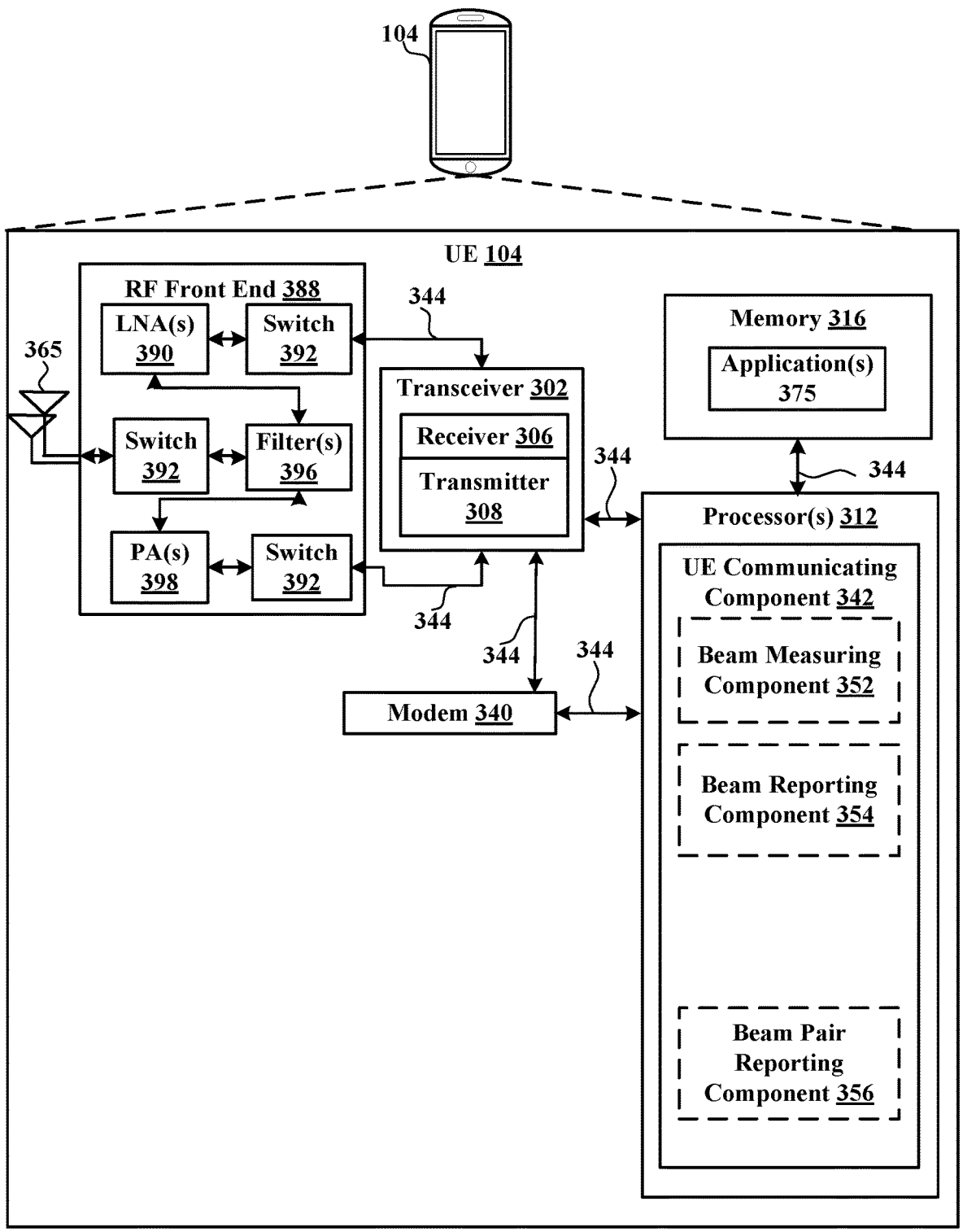
FIG. 3 is a block diagram illustrating an example of a user equipment (UE), in accordance with various aspects of the present disclosure.

Referring to FIG. 3, one example of an implementation of UE 104 may include a variety of components, some of which have already been described above and are described further herein, including components such as one or more processors 312 and memory 316 and transceiver 302 in communication via one or more buses 344, which may operate in conjunction with modem 340 and/or UE communicating component 342 for reporting candidate uplink/downlink beam pairs where one or more beams of one or more beam pairs may be a multi-beam, in accordance with aspects described herein.

In an aspect, the one or more processors 312 can include a modem 340 and/or can be part of the modem 340 that uses one or more modem processors. Thus, the various functions related to UE communicating component 342 may be included in modem 340 and/or processors 312 and, in an aspect, can be executed by a single processor, while in other aspects, different ones of the functions may be executed by a combination of two or more different processors. For example, in an aspect, the one or more processors 312 may include any one or any combination of a modem processor, or a baseband processor, or a digital signal processor, or a transmit processor, or a receiver processor, or a transceiver processor associated with transceiver 302. In other aspects, some of the features of the one or more processors 312 and/or modem 340 associated with UE communicating component 342 may be performed by transceiver 302.

Also, memory 316 may be configured to store data used herein and/or local versions of applications 375 or UE communicating component 342 and/or one or more of its subcomponents being executed by at least one processor 312. Memory 316 can include any type of computer-readable medium usable by a computer or at least one processor 312, such as random access memory (RAM), read only memory (ROM), tapes, magnetic discs, optical discs, volatile memory, non-volatile memory, and any combination thereof. In an aspect, for example, memory 316 may be a non-transitory computer-readable storage medium that stores one or more computer-executable codes defining UE communicating component 342 and/or one or more of its subcomponents, and/or data associated therewith, when UE 104 is operating at least one processor 312 to execute UE communicating component 342 and/or one or more of its subcomponents.

Transceiver 302 may include at least one receiver 306 and at least one transmitter 308. Receiver 306 may include hardware, firmware, and/or software code executable by a processor for receiving data, the code comprising instructions and being stored in a memory (e.g., computer-readable medium). Receiver 306 may be, for example, a radio frequency (RF) receiver. In an aspect, receiver 306 may receive signals transmitted by at least one base station 102. Additionally, receiver 306 may process such received signals, and also may obtain measurements of the signals, such as, but not limited to, Ec/Io, signal-to-noise ratio (SNR), reference signal received power (RSRP), reference signal received quality (RSRQ), received signal strength indicator (RSSI), etc. Transmitter 308 may include hardware, firmware, and/or software code executable by a processor for transmitting data, the code comprising instructions and being stored in a memory (e.g., computer-readable medium). A suitable example of transmitter 308 may including, but is not limited to, an RF transmitter.

Moreover, in an aspect, UE 104 may include RF front end 388, which may operate in communication with one or more antennas 365 and transceiver 302 for receiving and transmitting radio transmissions, for example, wireless communications transmitted by at least one base station 102 or wireless transmissions transmitted by UE 104. RF front end 388 may be connected to one or more antennas 365 and can include one or more low-noise amplifiers (LNAs) 390, one or more switches 392, one or more power amplifiers (PAs) 398, and one or more filters 396 for transmitting and receiving RF signals.

In an aspect, LNA 390 can amplify a received signal at a desired output level. In an aspect, each LNA 390 may have a specified minimum and maximum gain values. In an aspect, RF front end 388 may use one or more switches 392 to select a particular LNA 390 and its specified gain value based on a desired gain value for a particular application.

Further, for example, one or more PA(s) 398 may be used by RF front end 388 to amplify a signal for an RF output at a desired output power level. In an aspect, each PA 398 may have specified minimum and maximum gain values. In an aspect, RF front end 388 may use one or more switches 392 to select a particular PA 398 and its specified gain value based on a desired gain value for a particular application.

Also, for example, one or more filters 396 can be used by RF front end 388 to filter a received signal to obtain an input RF signal. Similarly, in an aspect, for example, a respective filter 396 can be used to filter an output from a respective PA 398 to produce an output signal for transmission. In an aspect, each filter 396 can be connected to a specific LNA 390 and/or PA 398. In an aspect, RF front end 388 can use one or more switches 392 to select a transmit or receive path using a specified filter 396, LNA 390, and/or PA 398, based on a configuration as specified by transceiver 302 and/or processor 312.

As such, transceiver 302 may be configured to transmit and receive wireless signals through one or more antennas 365 via RF front end 388. In an aspect, transceiver may be tuned to operate at specified frequencies such that UE 104 can communicate with, for example, one or more base stations 102 or one or more cells associated with one or more base stations 102. In an aspect, for example, modem 340 can configure transceiver 302 to operate at a specified frequency and power level based on the UE configuration of the UE 104 and the communication protocol used by modem 340.

In an aspect, modem 340 can be a multiband-multimode modem, which can process digital data and communicate with transceiver 302 such that the digital data is sent and received using transceiver 302. In an aspect, modem 340 can be multiband and be configured to support multiple frequency bands for a specific communications protocol. In an aspect, modem 340 can be multimode and be configured to support multiple operating networks and communications protocols. In an aspect, modem 340 can control one or more components of UE 104 (e.g., RF front end 388, transceiver 302) to enable transmission and/or reception of signals from the network based on a specified modem configuration. In an aspect, the modem configuration can be based on the mode of the modem and the frequency band in use. In another aspect, the modem configuration can be based on UE configuration information associated with UE 104 as provided by the network during cell selection and/or cell reselection.

In an aspect, UE communicating component 342 can optionally include a beam measuring component 352 for performing a measurement of a signal metric related to a signal received using a certain transmit beam and/or receive beam, a beam reporting component 354 for reporting a set of candidate beams based on measurements of the associated signal metrics, and/or a beam pair reporting component 356 for measuring and/or reporting a set of candidate downlink/uplink beam pairs to use in wireless communications, in accordance with aspects described herein.

In an aspect, the processor(s) 312 may correspond to one or more of the processors described in connection with the UE in FIG. 12. Similarly, the memory 316 may correspond to the memory described in connection with the UE in FIG. 12.

Referring to FIG. 4, one example of an implementation of base station 102 (e.g., a base station 102 and/or gNB 180, as described above) may include a variety of components, some of which have already been described above, but including components such as one or more processors 412 and memory 416 and transceiver 402 in communication via one or more buses 444, which may operate in conjunction with modem 440 and BS communicating component 442 for configuring a UE for reporting candidate uplink/downlink beam pairs where one or more beams of one or more beam pairs may be a multi-beam, in accordance with aspects described herein.

The transceiver 402, receiver 406, transmitter 408, one or more processors 412, memory 416, applications 475, buses 444, RF front end 488, LNAs 490, switches 492, filters 496, PAs 498, and one or more antennas 465 may be the same as or similar to the corresponding components of UE 104, as described above, but configured or otherwise programmed for base station operations as opposed to UE operations.

In an aspect, BS communicating component 442 can optionally include a beam indicating component 452 for indicating candidate beams to be measured for communications by a UE, a beam measuring component 454 for performing a measurement of a signal received using a certain transmit beam and/or receive beam, and/or a beam pair selecting component 456 for selecting from reported candidate beam pairs for the UE, in accordance with aspects described herein.

In an aspect, the processor(s) 412 may correspond to one or more of the processors described in connection with the base station in FIG. 12. Similarly, the memory 416 may correspond to the memory described in connection with the base station in FIG. 12.

FIG. 5 illustrates examples of FD deployments 500, 502, 504 in accordance with aspects described herein. In FD deployment 500, a UE can be configured for FD and MIMO, and can communicate with TRP1 using uplink (UL) beam 1 (B1) and downlink (DL) B1. In this deployment, the UE can communicate with TRP2 using UL beam 2 (B2) and DL B2, where the UE can communicate concurrently using various antenna panels (e.g., one antenna panel for each of receiving based on DL B1, transmitting based on UL B1, receiving based on DL B2, and transmitting based on UL B2). As such, the various beams may exhibit some SI, and beam training can be performed, as described herein, to select desirable beam pairs, which may include one or more multi-beams (e.g., UL B1+B2, and/or DL B1+B2).

In FD deployment 502, the UE can be configured to communicate with TRP1 using DL B1, TRP2 using DL B2, TRP3 using UL B1, and TRP4 using UL B2. In FD deployment 504, the UE can be configured to communicate with TRP1 using DL B1 and DL B2, and TRP2 using UL B1 and UL B2. Similarly, in these examples, beam training can be performed, as described herein, to select desirable beam pairs, which may include one or more multi-beams (e.g., UL B1+B2, and/or DL B1+B2).

FIG. 6 illustrates a flow chart of an example of a method 600 for reporting a set of candidate beam pairs for use in communicating with one or more TRPs, in accordance with aspects described herein. FIG. 7 illustrates a flow chart of an example of a method 700 for configuring a UE to report a set of candidate beam pairs for use in communicating with one or more TRPs, in accordance with aspects described herein. In an example, a UE 104 can perform the functions described in method 600 using one or more of the components described in FIGS. 1 and 3, and a network node, such as a base station 102 or gNB, a portion of a disaggregated base station 102 or gNB, etc., can perform the functions described in method 700 using one or more of the components described in FIGS. 1 and 4. Though methods 600 and 700 are described in conjunction with one another for ease of explanation, the methods are not required to be performed in conjunction, and different devices can, or can be configured to, independently perform the different methods.

In method 700, at Block 702, a first indication of a set of candidate downlink beams corresponding to multiple downlink beams transmitted from one or more TRPs can be transmitted to the UE. In an aspect, beam indicating component 452, e.g., in conjunction with processor(s) 412, memory 416, transceiver 402, BS communicating component 442, etc., can transmit, to the UE (e.g., UE 104), the first indication of the set of candidate downlink beams corresponding to multiple downlink beams transmitted from one or more TRPs. For example, the one or more TRPs can transmit, to the UE 104, multiple downlink beams, and a set of the multiple downlink beams can be included in the first indication as a set of candidate downlink beams for subsequent SI measurement. For example, beam indicating component 452 may perform SI measurement for each TRP, which can be based on network implementation. In an example, where beam indicating component 452 performs SI measurements for each TRP, the SI measurements can be used to filter out beam combinations (e.g., multi-beams) for the UE described below. In one example, the UE 104 can report measurements of the multiple downlink beams, which beam indicating component 452 can use to select and indicate the set of candidate downlink beams.

In method 700, optionally at Block 704, the multiple downlink beams can be transmitted from multiple TRPs. In an aspect, BS communicating component 442, e.g., in conjunction with processor(s) 412, memory 416, transceiver 402, etc., can transmit the multiple downlink beams from the multiple TRPs. In one example, the network node can operate the multiple TRPs, such to transmit signals using the multiple TRPs and/or receive signals from the UE 104 or other UEs via the TRPs, where the network node can perform signal processing one or more layers.

In method 600, optionally at Block 602, downlink beam measurements of multiple downlink beams received from multiple TRPs can be performed. In an aspect, beam measuring component 352, e.g., in conjunction with processor(s) 312, memory 316, transceiver 302, UE communicating component 342, etc., can perform the downlink beam measurements of the multiple downlink beams received from the multiple TRPs. For example, beam measuring component can measure a RSRP, or another signal power/quality, of each of the multiple downlink beams. In one example, beam measuring component 352 can measure a single downlink beam of the multiple downlink beams at a time and can select a top number, N, of measured single beams for reporting to the network node for consideration as candidate downlink beams. For example, where beam measuring component 352 knows, receives, or can otherwise determine indices associated with the TRPs, beam measuring component 352 can select and report a number of beams per TRP, such as reporting N/M beams for each of M TRPs (e.g., N/2 beams for 2 TRPs).

In this example, in method 600, optionally at Block 604, a first number of measured downlink beams from a first TRP and a second number of measured downlink beams from a second TRP can be selected from the multiple downlink beams and based on the downlink beam measurements. In an aspect, beam reporting component 354, e.g., in conjunction with processor(s) 312, memory 316, transceiver 302, UE communicating component 342, etc., can select, from the multiple downlink beams and based on the downlink beam measurements, the first number of measured downlink beams from the first TRP and the second number of measured downlink beams from the second TRP. For example, beam reporting component 354 can select N/M beams for each of M TRPs, as described.

In another example, performing the downlink beam measurements can include selecting a subset of the multiple downlink beams, and/or one or more beam combinations of downlink beams (e.g., multi-downlink beams) over which to perform another measurement, such as layer 1 (L1)-SINR (e.g., at the PHY layer). In an example, beam measuring component 352 can, for the N candidate beams, select up to C(N,2) beam combinations to measure L1-SINR where the C(N,2) beam combinations are the candidate downlink beam combinations for simultaneous or concurrent receiving from multiple TRPs (e.g., 2 TRPs in this example). Where beam measuring component 352 reports per TRP measured downlink beams, beam measuring component 352 may also select up to N/2*N/2 beam combinations over which to measure DL L1-SINR. For example, for each combination of two receive beams, for receive beam 1 (B1), beam measuring component 352 can measure channel measurement report (CMR) for B1 and interference measurement report (IMR) for B2, and for receive beam 2 (B2), beam measuring component 352 can measure CMR for B2 and IMR for B1. UE communicating component 342 can receive the downlink beams in the combination over different antenna panels of the UE 104, and in an example, beam measuring component 352 can select and/or measure the beam combinations to include different beams received over different antenna panels.

In another example, beam measuring component 352 can, for up to C(N,2)+N downlink beams, select a top K1 (e.g., K1=4) measured downlink beams for reporting to the network node based on a rate (e.g., a sum rate) calculated using SINR(s). In this example, the K1 measured downlink beams may include single beams or beam combinations.

In some examples, as described above, in method 600, optionally at Block 606, a measured set of downlink beams, including at least a portion of the first number of measured downlink beams and the second number of measured downlink beams, can eb reported to the network node. In an aspect, beam reporting component 354, e.g., in conjunction with processor(s) 312, memory 316, transceiver 302, UE communicating component 342, etc., can report, to the network node, the measured set of downlink beams including at least the portion of the first number of measured downlink beams and the second number of measured downlink beams. For example, as described above, beam reporting component 354 can report single beams from each of multiple TRPs (e.g., N/M beams for each of M TRPs). In another example, as described above, beam reporting component 354 can report a top K1 measured downlink beams, which may include single beams from one or more TRPs or beam combinations from multiple TRPs.

In method 700, optionally at Block 706, a measured set of downlink beams, including at least a portion of a first number of measured downlink beams from a first TRP and a second number of measured downlink beams from a second TRP, can be received from the UE. In an aspect, BS communicating component 442, e.g., in conjunction with processor(s) 412, memory 416, transceiver 402, etc., can receive, from the UE (e.g., UE 104), the measured set of downlink beams including at least the portion of the first number of measured downlink beams from the first TRP and the second number of measured downlink beams from the second TRP. For example, as described above, BS communicating component 442 can receive, from the UE, a report of single beams from each of multiple TRPs (e.g., N/M beams for each of M TRPs). In another example, as described above, BS communicating component 442 can receive, from the UE, a report of a top K1 measured downlink beams, which may include single beams from one or more TRPs or beam combinations from multiple TRPs.

In method 700, optionally at Block 708, the set of candidate downlink beams can be selected based on the measured set of downlink beams. In an aspect, beam indicating component 452, e.g., in conjunction with processor(s) 412, memory 416, transceiver 402, BS communicating component 442, etc., can select the set of candidate downlink beams based on the measured set of downlink beams. For example, beam indicating component 452 can select the set of candidate downlink beams based on selecting a subset of the measured set of downlink beams (e.g., a subset of the N beams or K1 beams, which can include single beams or beam combinations) based on measurements reported for the beams (e.g., L1-SINR measurements). As described, beam indicating component 452 can transmit the selected candidate beams to the UE 104 (e.g., at Block 702).

In method 600, at Block 608, a first indication of a set of candidate downlink beams corresponding to multiple downlink beams received from one or more TRPs can be received from the network node. In an aspect, beam measuring component 352, e.g., in conjunction with processor(s) 312, memory 316, transceiver 302, UE communicating component 342, etc., can receive, from the network node, the first indication of the set of candidate downlink beams corresponding to multiple downlink beams received from the one or more TRPs. In one example, beam measuring component 352 can receive the set of candidate downlink beams based on the measured set of downlink beams reported to the network node, as described above. In other examples, beam measuring component 352 can receive the set of candidate downlink beams based on other considerations or at the decision or discretion of the network node. An example of measuring single downlink beams and downlink beam combinations is shown in FIG. 8.

Figure 8:
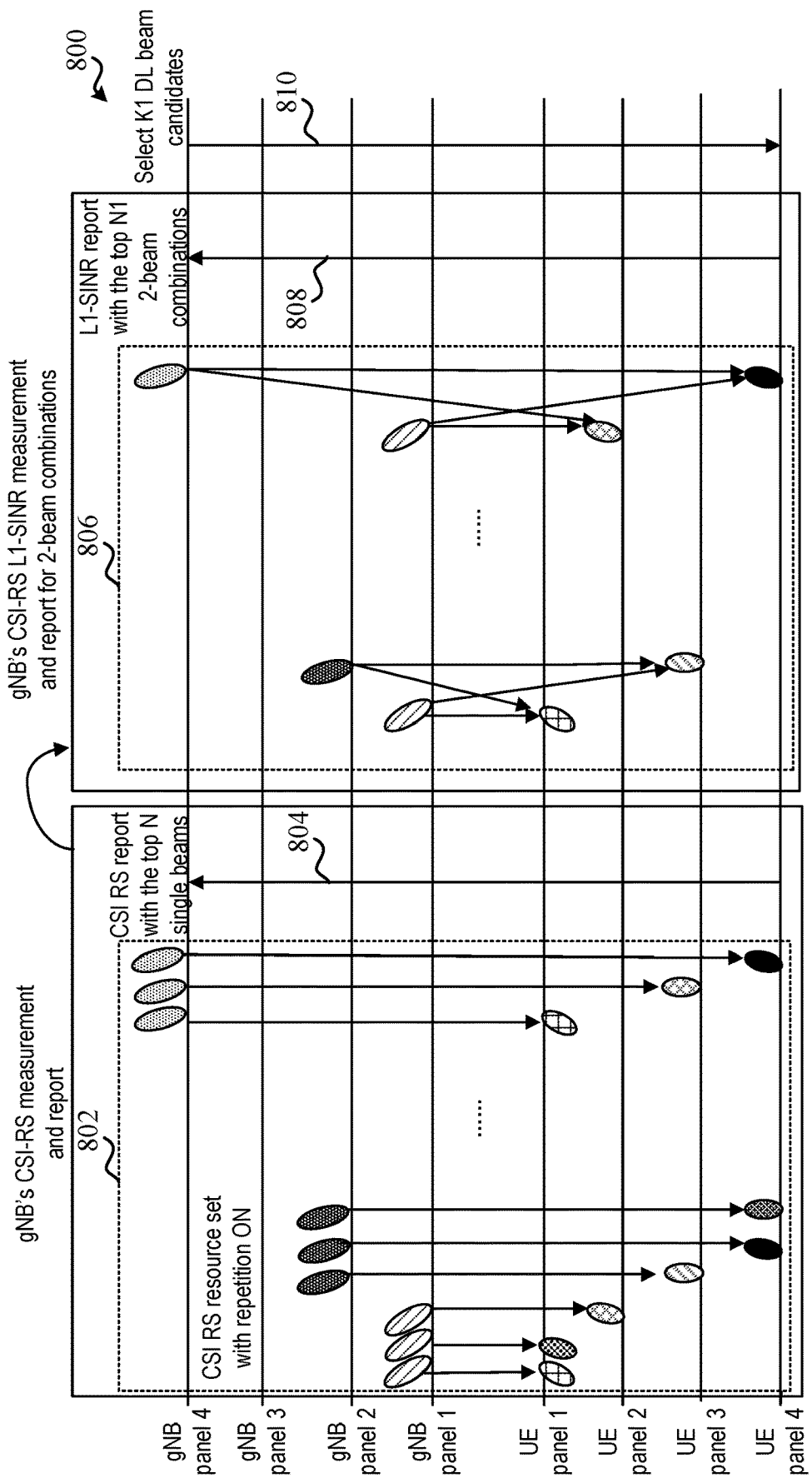
FIG. 8 illustrates an example of a timeline for receiving and measuring single downlink beams and downlink beam combinations, in accordance with aspects described herein.

FIG. 8 illustrates an example of a timeline 800 for receiving and measuring single downlink beams and downlink beam combinations. In timeline 800, a gNB can transmit beams from multiple antenna panels, which may be part of, or provided by, multiple TRPs. In timeline 800, the gNB can transmit single beams at 802, and the UE can receive the signal beams over multiple antenna panels. The UE can provide a CSI-RS report indicating a top N beams at 804. The gNB can then transmit beam combinations at 806, where each beam combination includes two beams transmitted by two TRPs. The UE can receive the beams using each of two antenna panels. The UE can provide a L1-RSRP report indicate the top N1 downlink multi-beams at 808. The gNB can select and/or indicate the top K1 downlink beam candidates to the UE at 810.

In method 700, at Block 710, a second indication of a set of candidate uplink beams of multiple uplink beams can be transmitted to a UE. In an aspect, beam indicating component 452, e.g., in conjunction with processor(s) 412, memory 416, transceiver 402, BS communicating component 442, etc., can transmit, to the UE (e.g., UE 104), the second indication of the set of candidate uplink beams of the multiple uplink beams. For example, the set of candidate uplink beams can be selected based on measuring beams received from the UE or based on the set of candidate downlink beams.

Thus, in one example, at Block 712, the set of candidate uplink beams can be selected as a subset of the set of candidate downlink beams. In an aspect, beam indicating component 452, e.g., in conjunction with processor(s) 412, memory 416, transceiver 402, BS communicating component 442, etc., can select the set of candidate uplink beams, for the second indication transmitted to the UE, as a subset of the set of candidate downlink beams (e.g., as beams that are channel reciprocal to the subset of the set of candidate downlink beams). In one example, where the UE 104 reported K1 measured downlink beams that beam indicating component 452 selected as candidate downlink beams, beam indicating component 452 can use (or indicate in the first indication) a subset including K1/2 as candidate downlink beams, and a subset including the other K1/2 as candidate uplink beams.

In another example, where the set of candidate uplink beams can be selected based on measuring beams received from the UE, optionally at Block 610, a set of multiple uplink beams can be transmitted to the network node. In an aspect, UE communicating component 342, e.g., in conjunction with processor(s) 312, memory 316, transceiver 302, etc., can transmit, to the network node, the set of multiple uplink beams. For example, the UE can be configured with a number of antenna panels and a number of beams per antenna panel. UE communicating component 342 can accordingly transmit the various single beams or multi-beams to the network node for measurement and selection of candidate uplink beams.

For example, transmitting an uplink beam may optionally include, at Block 612, concurrently transmitting, for an uplink beam combination, a first beam using a first antenna panel and a second beam using a second antenna panel. In an aspect, UE communicating component 342, e.g., in conjunction with processor(s) 312, memory 316, transceiver 302, etc., can concurrently transmit, for the uplink beam combination, the first beam using the first antenna panel and the second beam using the second antenna panel. Transmitting the multiple uplink beams may be based on a codebook configured by the network node or otherwise, in some examples. In one specific non-limiting example, the UE may be configured with 4 beams per UE antenna panel and there may be 2 antenna panels of the UE. In this example, there can be 8 single beams transmitted—4 from the first antenna panel, and 4 from the second antenna panel. For measuring at multiple TRPs, in an example, UE communicating component 342 can also transmit the beams as multi-beams, and there can be 32 2-beam combinations, as described further herein.

In this example, in method 700, optionally at Block 714, multiple uplink beams can be received from the UE. In an aspect, BS communicating component 442, e.g., in conjunction with processor(s) 412, memory 416, transceiver 402, etc., can receive, from the UE (e.g., UE 104), the multiple uplink beams. In one example, this can optionally include, at Block 716, concurrently receiving, for an uplink beam combination, a first beam using a first antenna panel and a second beam using a second antenna panel. As described, for example, the first and second antenna panels can be located at, or otherwise provided by, different TRPs. In this regard, for example, single beams can be received at each TRP, and multi-beams can be concurrently received at both TRPs, where one TRP can receive a first beam of the multi-beam for CMR and a second beam of the multi-beam for IMR while another TRP can receive the second beam for CMR and the first beam for IMR. For example, the UE 104 can transmit sounding reference signal (SRS) resource sets from different UE antenna panels, and the RSRP can be calculated at multiple TRPs for all beams of all panels such to calculate inter-beam interference and/or select the set of candidate uplink beams. For example, for a pair of uplink beams e.g., beam 1 and beam 2, gNB can configure the first SRS beam as CMR for TRP 1 and a second SRS beam as IMR for TRP 1, gNB can also configure the second SRS beam as CMR for TRP 2 and the first SRS beam as IMR for TRP 2.

In any case, in the specific example described above, there can be 8 single beams for TRP1, 8 single beams for TRP2, and 32 2-beam combinations for 2 TRPs, which can result in 48 possible uplink beams for consideration in the set of candidate uplink beams. Among 48 possible beams, for example, beam indicating component 452 can select a top K2 candidate uplink beams which have a best rate (e.g., sum rate), as described further herein. For example, for the 32 2-beam combinations beam measuring component 454 can calculate 32*2 SINRs=32 paired SINR values, and beam indicating component 452 can select a minimum SINR value in each SINR pair to generate 32 SINRs for the 32 2-beam combinations, and/or may use minimum SINR as an additional selection metric for selecting the uplink beams for the set of candidate uplink beams. In an example, the K2 (e.g. K2=4) candidate uplink beams may include single beams or multi-beams, as described.

Figure 9:
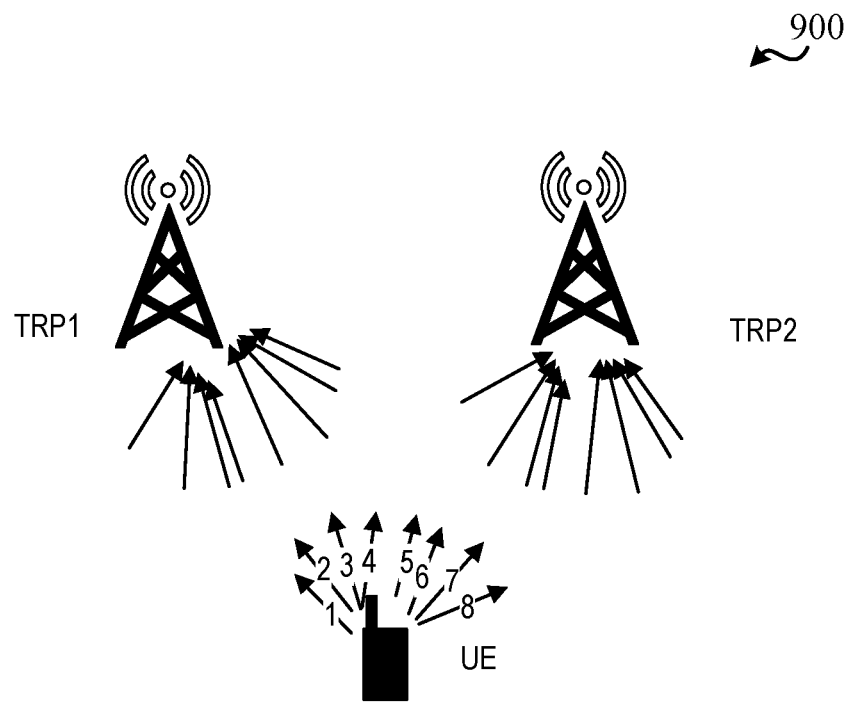
FIG. 9 illustrates an example of a system with a UE transmitting 8 beams, which can be separately received by TRP1 and TRP2, in accordance with aspects described herein.

FIG. 9 illustrates an example of a system 900 with a UE transmitting 8 beams, which can be separately received by TRP1 and TRP2, as described above and further herein. In this example, beam measuring component 454 can measure the beams (e.g., SINR) as received at each TRP. Thus, for example, beam measuring component 454 can measure the beams 1-8 as received at TRP1 and beams 1-8 as received at TRP2. Beam measuring component 454 can also measure the various combinations of multi-beams for inter-cell interference measurements, which can be represented as CMR/IMR for (TRP1, TRP2) for two beams (1, 2) in the following table:

| (CMR1/ IMR5, CMR5/ IMR1) | (CMR2/ IMR5, CMR5/ IMR2) | (CMR3/ IMR5, CMR5/ IMR3) | (CMR4/ IMR5, CMR5/ IMR4) | (CMR5/ IMR1, CMR1/ IMR5) | (CMR6/ IMR1, CMR1/ IMR6) | (CMR7/ IMR1, CMR1/ IMR7) | (CMR8/ IMR1, CMR1/ IMR8) |
|---|---|---|---|---|---|---|---|
| (CMR1/ IMR6, CMR6/ IMR1) | (CMR2/ IMR6, CMR6/ IMR2) | (CMR3/ IMR6, CMR6/ IMR3) | (CMR4/ IMR6, CMR6/ IMR4) | (CMR5/ IMR2, CMR2/ IMR5) | (CMR6/ IMR2, CMR2/ IMR6) | (CMR7/ IMR2, CMR2/ IMR7) | (CMR8/ IMR2, CMR2/ IMR8) |
| (CMR1/ IMR7, CMR7/ IMR1) | (CMR2/ IMR7, CMR7/ IMR2) | (CMR3/ IMR7, CMR7/ IMR3) | (CMR4/ IMR7, CMR7/ IMR4) | (CMR5/ IMR3, CMR3/ IMR5) | (CMR6/ IMR3, CMR3/ IMR6) | (CMR7/ IMR3, CMR3/ IMR7) | (CMR8/ IMR3, CMR3/ IMR8) |
| (CMR1/ IMR8, CMR8/ IMR1) | (CMR2/ IMR8, CMR8/ IMR2) | (CMR3/ IMR8, CMR8/ IMR3) | (CMR4/ IMR8, CMR8/ IMR4) | (CMR5/ IMR4, CMR4/ IMR5) | (CMR6/ IMR4, CMR4/ IMR6) | (CMR7/ IMR4, CMR4/ IMR7) | (CMR8/ IMR4, CMR4/ IMR8) |

Beam measuring component 454 can measure these various beam combinations to determine which beams and/or beam combinations as received from the UE have a highest SINR for consideration or selection in the set of uplink candidate beams.

In method 600, at Block 614, a second indication of a set of candidate uplink beams can be received from the network node. In an aspect, beam measuring component 352, e.g., in conjunction with processor(s) 312, memory 316, transceiver 302, UE communicating component 342, etc., can receive, from the network node, the second indication of the set of candidate uplink beams. In one example, as described, the set of candidate uplink beams may include single uplink beams or one or more uplink beam combinations (e.g., multi-beams). An example of measuring single uplink beams and uplink beam combinations is shown in FIG. 10.

Figure 10:
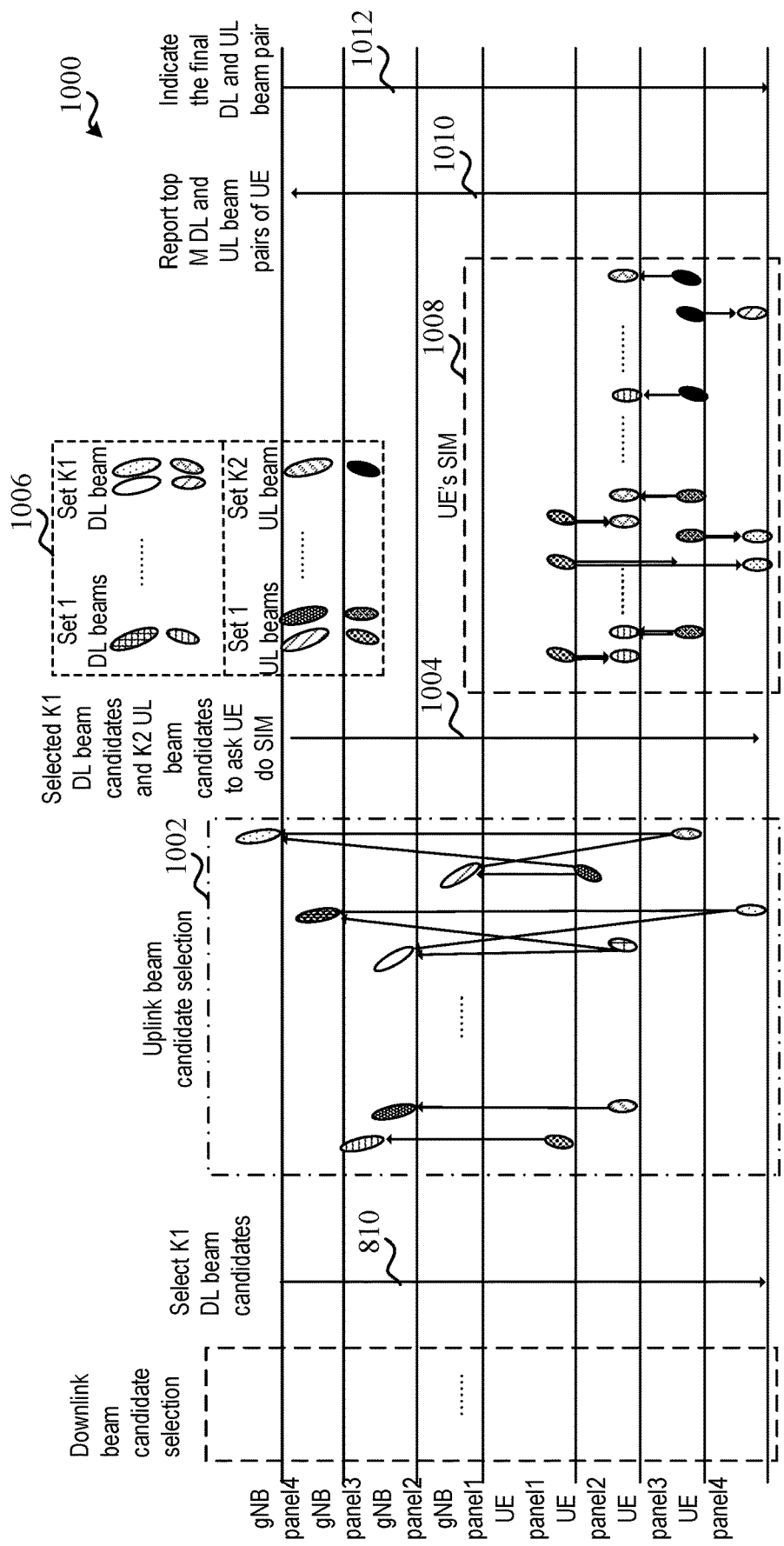
FIG. 10 illustrates an example of a timeline for receiving and measuring single uplink beams and uplink beam combinations, in accordance with aspects described herein.

FIG. 10 illustrates an example of a timeline 1000 for receiving and measuring single uplink beams and uplink beam combinations. In timeline 1000, after downlink beam candidates are selected as described at 810 of FIG. 8 (or otherwise), an uplink beam candidate selection process 1002 can be performed. For example, the UE can transmit beams from multiple UE antenna panels. In process 1002, the UE can transmit signal beams and the gNB can receive signal beams, and then the UE can also transmit multi-beams (concurrently transmitted uplink beams from different UE antenna panels) that the gNB can receive using multiple antenna panels. The gNB can select the set of candidate uplink beams based on measurements thereof and notify the UE at 1004. A beam sweeping process can occur at 1006 and 1008, where the gNB can transmit the set of candidate downlink beams at 1006, and the UE can transmit the set of candidate uplink beams at 1008, such that the UE can measure interference on the received downlink beams, as described above. The UE can select the top M beam pair candidates based on measured SINR or other signal metrics in view of interference from the uplink beams or other downlink beams in a multi-beam, and can report the beam pair candidates to the gNB at 1010. The gNB can select the final beam pair and notify the UE at 1012, as described further herein.

In method 600, at Block 616, beam pair measurements can be performed of each candidate downlink beam in the set of candidate downlink beams received while transmitting each candidate uplink beam in the set of candidate uplink beams to select a set of candidate beam pairs. In an aspect, beam measuring component 352, e.g., in conjunction with processor(s) 312, memory 316, transceiver 302, UE communicating component 342, etc., can perform the beam pair measurements of each candidate downlink beam in the set of candidate downlink beams received while transmitting each candidate uplink beam in the set of candidate uplink beams. For example, beam measuring component 352 can measure the beam pairs as part of a beam sweep procedure performed by the network node and UE 104 to determine a desired uplink/downlink beam pair for FD communications, where the uplink beam or the downlink beam of the desired uplink/downlink beam pair may include a multi-beam.

In method 700, at Block 720, each candidate downlink beam in the set of candidate downlink beams can be transmitted to the UE. In an aspect, BS communicating component 442, e.g., in conjunction with processor(s) 412, memory 416, transceiver 402, etc., can transmit, to the UE (e.g., UE 104), each candidate downlink beam in the set of candidate downlink beams. In an example, BS communicating component 442 can transmit the set of candidate downlink beams multiple times as part of the beam sweeping procedure, such to allow the UE 104 to measure the downlink beams while transmitting each candidate uplink beam in the set of candidate uplink beams.

Referring back to Block 616, for example, beam measuring component 352 can perform beam pair selection considering SI measurements for downlink and uplink beams. For example, where the set of candidate downlink beams includes 4 beams or beam combinations (e.g., K1=4) and the set of candidate uplink beams includes 4 beams or beam combinations (e.g., K2=4), where a candidate downlink beam includes a 2-beam combination and a candidate uplink beam includes a 2-beam combination, the UE 104 can use 4 antenna panels to support this FD mode. For example, for single beam downlink and single beam uplink SI measurements, beam measuring component 352 can calculate cross beam SINR as described above. For example, for single beam downlink and 2-beam uplink SI measurement, beam measuring component 352 can measure 1 CMR with two SI IMRs, and as such can calculate 2 SINRs for the downlink beam as received. For example, for 2-beam downlink and single beam uplink SI measurement, for each DL beam, beam measuring component 352 can measure 1 CMR with two IMRs (one for SI, one for inter-DL beam interference), and as such can calculate 2 SINRs for the downlink beam as received.

For example, for 2-beam downlink and 2-beam uplink SI measurement, for each downlink beam, beam measuring component 352 can measure 1 CMR with 3 IMRs (e.g., beam 2 to beam 1 non-zero power (NZP) CSIRS1 IMR1, NZP SRS1 for transmit beam 1 IMIR2 to receive beam 1, NZP SRS2 for transmit beam 2 IMR3 to receive beam 1). As such, beam measuring component 352 can calculate 2 SINRs for the downlink beam as received. In one example, beam measuring component 352 can perform time domain multiplexed (TDM) measurements to measure two downlink beams as received: SIs: UL B1 to DL B1, UL B1 to DL B2, UL B2 to DL B1, UL B2 to DL B2. In another example, beam measuring component 352 can concurrently measure one or two downlink beams, as received, interfered from two uplink transmitted beams. An example of the SI measurements for beam pair selections is shown in FIG. 10.

Figure 11:
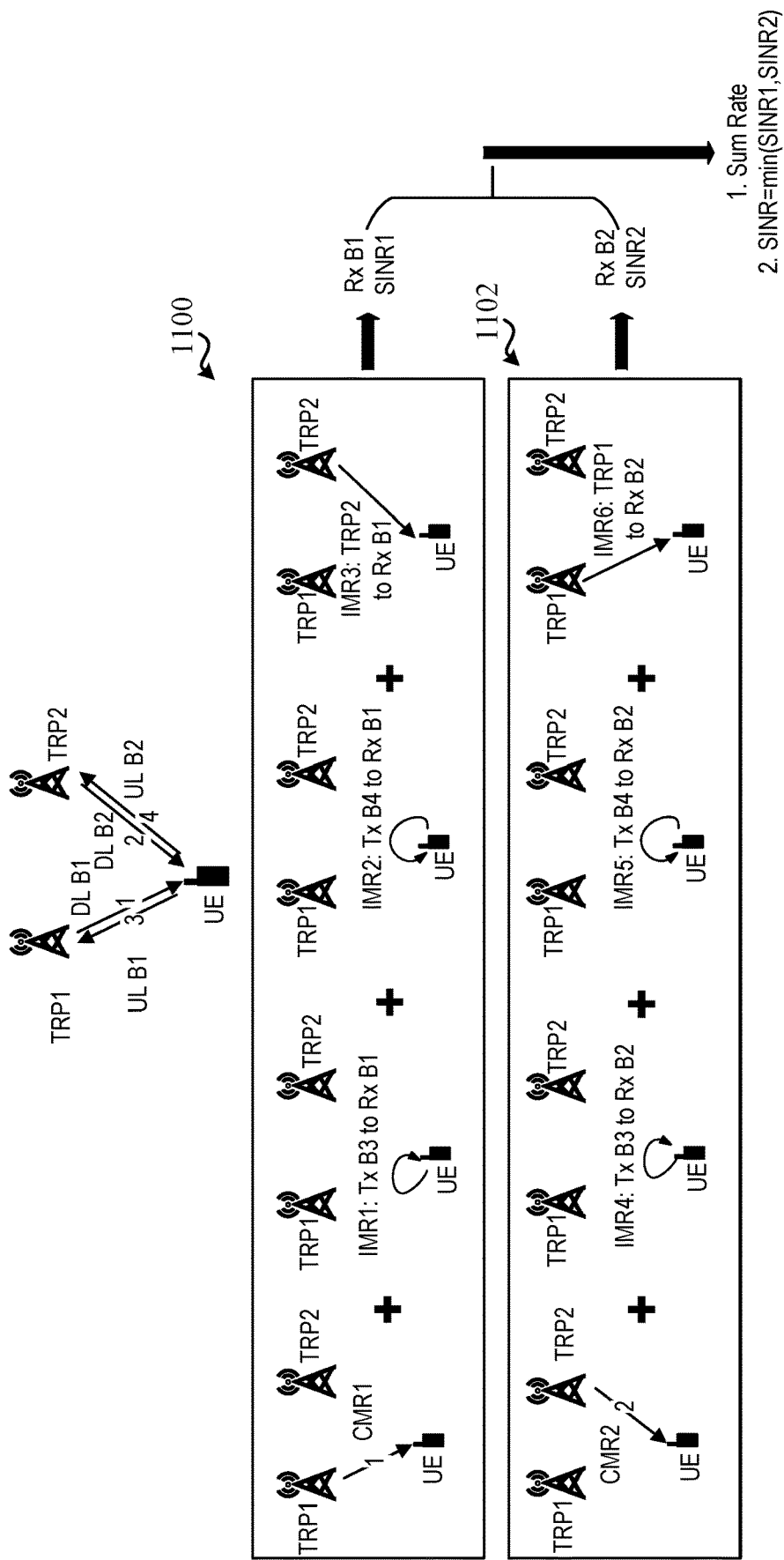
FIG. 11 illustrates an example of a process for computing self-interference (SI) measurements for beam pairs, in accordance with aspects described herein.

FIG. 11 illustrates an example of a process for computing SI measurements for beam pairs. In FIG. 11, a UE communicates with a first TRP1 using downlink beam 1 and uplink beam 1, and with TRP2 using a downlink beam 2 and uplink beam 2. This may be for the purpose of SI measurement. As such, for downlink beam 1, at 1100, the UE can sum the SINR for CMR1 for downlink beam 1, the IMR from transmitting uplink beam 1 caused to receiving downlink beam 1, the IMR from transmitting uplink beam 2 caused to receiving downlink beam 1, and the IMR from receiving downlink beam 2 from TRP2 caused to receiving downlink beam 1, to generate the total SINR for receiving downlink beam 1. In addition, for downlink beam 2, at 1102, the UE can sum the SINR for CMR2 for downlink beam 2, the IMR from transmitting uplink beam 1 caused to receiving downlink beam 2, the IMR from transmitting uplink beam 2 caused to receiving downlink beam 2, and the IMR from receiving downlink beam 1 from TRP2 caused to receiving downlink beam 2, to generate the total SINR for receiving downlink beam 2.

The UE can sum the SINRs or use some other function there of (e.g., min(SINR for downlink beam 1, SINR for downlink beam 2) to compute an overall SINR for receiving downlink beam 1. Beam measuring component 352 can measure the SINR using the above process, in one example. In the example above, in performing beam pair measurements, sweeping through 4 uplink beam candidates with each sweeping through up to 4 downlink beam candidates, there are up to 16 uplink/downlink beam pairs with up to 16 sum rate/SINR values. For example, beam measuring component 352 can measure uplink beams (IMR1 and IMR2) and downlink (CMR1,2; 3,4; 5,6; 7,8); uplink beams (IMR3 and IMR4) and DL (CMR1,2; 3,4; 5,6; 7,8), and so on. In an example, beam measuring component 352 can measure the various beam pairs, and beam pair reporting component 356 can select the top M uplink/downlink beam pairs for reporting as a set of candidate beam pairs to the network node.

In method 600, at Block 618, a third indication of the set of candidate beam pairs can be reported to the network node. In an aspect, beam pair reporting component 356, e.g., in conjunction with processor(s) 312, memory 316, transceiver 302, UE communicating component 342, etc., can select the set of candidate beam pairs and/or can report, to the network node, the third indication of the set of candidate beam pairs. For example, beam pair reporting component 356 can report the top M uplink/downlink candidate beam pairs with global CMR ID (single DL beam) or CMR IDs (2 DL beams).

In method 700, at Block 722, a third indication of a set of candidate beam pairs based on receiving each candidate downlink beam in the set of candidate downlink beams while transmitting each candidate uplink beam in the set of candidate uplink beams can be received. In an aspect, beam pair selecting component 456, e.g., in conjunction with processor(s) 412, memory 416, transceiver 402, BS communicating component 442, etc., can receive, from the UE (e.g., UE 104), the third indication of the set of candidate beam pairs based on the UE receiving each candidate downlink beam in the set of candidate downlink beams while transmitting each candidate uplink beam in the set of candidate uplink beams. As described, the UE 104 can generate the set of candidate beam pairs, where a given beam pair may include at least an uplink beam or a downlink beam that is a multi-beam.

In method 700, optionally at Block 724, a beam pair in the set of candidate beam pairs can be selected, based on measurement received for the set of candidate beam pairs. In an aspect, beam pair selecting component 456, e.g., in conjunction with processor(s) 412, memory 416, transceiver 402, BS communicating component 442, etc., can select, based on measurements received for the set of candidate beam pairs, the beam pair in the set of candidate beam pairs. For example, beam pair selecting component 456 can select the beam pair in the set of candidate beam pairs that has a highest SINR measurement. In one example, in selecting the beam pair, beam pair selecting component 456 may filter, out of the set of candidate beam pairs, beam pairs that use the same antenna panel.

In method 700, optionally at Block 726, a fourth indication of the beam pair can be transmitted to the UE. In an aspect, beam pair selecting component 456, e.g., in conjunction with processor(s) 412, memory 416, transceiver 402, BS communicating component 442, etc., can transmit, to the UE, a fourth indication of the beam pair.

In method 600, optionally at Block 620, a fourth indication of a beam pair in the set of candidate beam pairs can be received from the network node for use in communicating with the one or more TRPs. In an aspect, UE communicating component 342, e.g., in conjunction with processor(s) 312, memory 316, transceiver 302, etc., can receive, from the network node, the fourth indication of the beam pair in the set of candidate beam pairs for use in communicating with the one or more TRPs. UE communicating component 342 can accordingly use the beam pair in communicating with the one or more TRPs (e.g., based on transmitting to the one or more TRPs using the uplink beam, receiving from the one or more TRPs using the downlink beam, etc.), which may include FD communications with the one or more TRPs.

Referring back to FIG. 5, aspects described herein can relate to FD deployment 500, but can also be used for deployments 502, 504. In one example, in deployments 502, 504, the TRP may not use FD capability, and the TRP SI measurements described above may not be used. The network node may configure different TRPs for uplink than for downlink. In addition, for example, inter-TRP beam interference may be considered in an uplink direction. Moreover, in one example, SRS transmitted by the UE 104 can be reused in measuring beam pair candidates, or partially merged to reduce resource overhead. For example, beam indicating component 452 may indicate the SRS measurements to the UE 104 for use in computing the SINR of a received downlink beam with potential interference based on the SRS measurements (instead of necessarily transmitting the uplink beam in the process).

Figure 12:
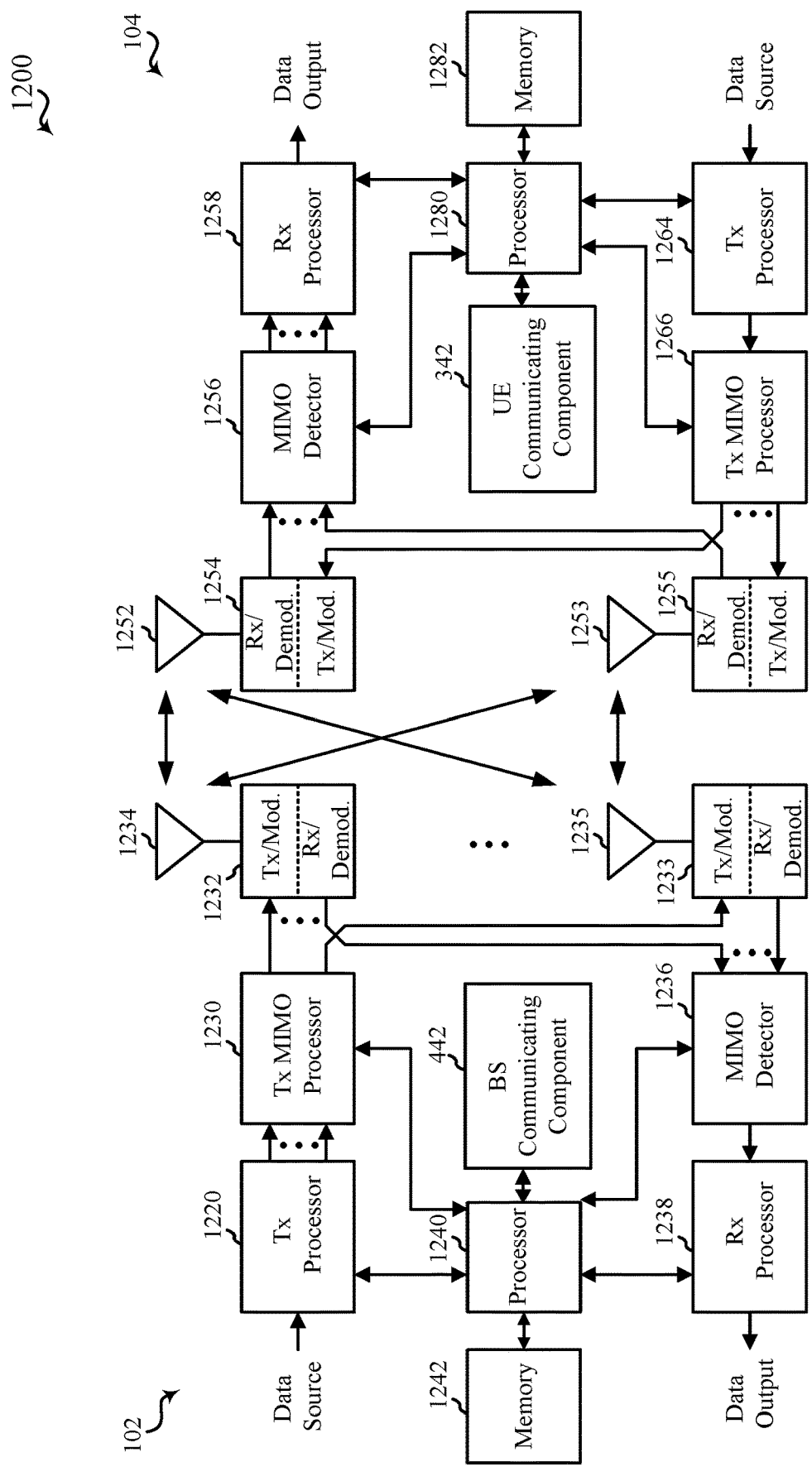
FIG. 12 is a block diagram illustrating an example of a multiple-input multiple-output (MIMO) communication system including a base station and a UE, in accordance with various aspects of the present disclosure.

FIG. 12 is a block diagram of a MIMO communication system 1200 including a base station 102 and a UE 104. The MIMO communication system 1200 may illustrate aspects of the wireless communication access network 100 described with reference to FIG. 1. The base station 102 may be an example of aspects of the base station 102 described with reference to FIG. 1. The base station 102 may be equipped with antennas 1234 and 1235, and the UE 104 may be equipped with antennas 1252 and 1253. In the MIMO communication system 1200, the base station 102 may be able to send data over multiple communication links at the same time. Each communication link may be called a "layer" and the "rank" of the communication link may indicate the number of layers used for communication. For example, in a 2×2 MIMO communication system where base station 102 transmits two "layers," the rank of the communication link between the base station 102 and the UE 104 is two.

At the base station 102, a transmit (Tx) processor 1220 may receive data from a data source. The transmit processor 1220 may process the data. The transmit processor 1220 may also generate control symbols or reference symbols. A transmit MIMO processor 1230 may perform spatial processing (e.g., precoding) on data symbols, control symbols, or reference symbols, if applicable, and may provide output symbol streams to the transmit modulator/demodulators 1232 and 1233. Each modulator/demodulator 1232 through 1233 may process a respective output symbol stream (e.g., for OFDM, etc.) to obtain an output sample stream. Each modulator/demodulator 1232 through 1233 may further process (e.g., convert to analog, amplify, filter, and upconvert) the output sample stream to obtain a DL signal. In one example, DL signals from modulator/demodulators 1232 and 1233 may be transmitted via the antennas 1234 and 1235, respectively.

The UE 104 may be an example of aspects of the UEs 104 described with reference to FIGS. 1 and 3. At the UE 104, the UE antennas 1252 and 1253 may receive the DL signals from the base station 102 and may provide the received signals to the modulator/demodulators 1254 and 1255, respectively. Each modulator/demodulator 1254 through 1255 may condition (e.g., filter, amplify, downconvert, and digitize) a respective received signal to obtain input samples. Each modulator/demodulator 1254 through 1255 may further process the input samples (e.g., for OFDM, etc.) to obtain received symbols. A MIMO detector 1256 may obtain received symbols from the modulator/demodulators 1254 and 1255, perform MIMO detection on the received symbols, if applicable, and provide detected symbols. A receive (Rx) processor 1258 may process (e.g., demodulate, deinterleave, and decode) the detected symbols, providing decoded data for the UE 104 to a data output, and provide decoded control information to a processor 1280, or memory 1282.

The processor 1280 may in some cases execute stored instructions to instantiate a UE communicating component 342 (see e.g., FIGS. 1 and 3).

On the uplink (UL), at the UE 104, a transmit processor 1264 may receive and process data from a data source. The transmit processor 1264 may also generate reference symbols for a reference signal. The symbols from the transmit processor 1264 may be precoded by a transmit MIMO processor 1266 if applicable, further processed by the modulator/demodulators 1254 and 1255 (e.g., for single carrier-FDMA, etc.), and be transmitted to the base station 102 in accordance with the communication parameters received from the base station 102. At the base station 102, the UL signals from the UE 104 may be received by the antennas 1234 and 1235, processed by the modulator/demodulators 1232 and 1233, detected by a MIMO detector 1236 if applicable, and further processed by a receive processor 1238. The receive processor 1238 may provide decoded data to a data output and to the processor 1240 or memory 1242.

The processor 1240 may in some cases execute stored instructions to instantiate a BS communicating component 442 (see e.g., FIGS. 1 and 4).

The components of the UE 104 may, individually or collectively, be implemented with one or more ASICs adapted to perform some or all of the applicable functions in hardware. Each of the noted modules may be a means for performing one or more functions related to operation of the MIMO communication system 1200. Similarly, the components of the base station 102 may, individually or collectively, be implemented with one or more application specific integrated circuits (ASICs) adapted to perform some or all of the applicable functions in hardware. Each of the noted components may be a means for performing one or more functions related to operation of the MIMO communication system 1200.

The following aspects are illustrative only and aspects thereof may be combined with aspects of other embodiments or teaching described herein, without limitation.

Aspect 1 is a method for wireless communication including receiving, from a network node, a first indication of a set of candidate downlink beams corresponding to multiple downlink beams received from one or more TRPs, receiving, from the network node, a second indication of a set of candidate uplink beams of multiple uplink beams, where at least one downlink beam in the set of candidate downlink beams includes a downlink beam combination of multiple downlink beams or at least one uplink beam in the set of candidate uplink beams includes an uplink beam combination of multiple uplink beams, performing beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams, and reporting, to the network node, a third indication of the set of candidate beam pairs.

In Aspect 2, the method of Aspect 1 includes receiving, from the network node, a fourth indication of a beam pair in the set of candidate beam pairs for use in communicating with the one or more TRPs.

In Aspect 3, the method of any of Aspects 1 or 2 includes performing downlink beam measurements of the multiple downlink beams received from multiple TRPs, selecting, from the multiple downlink beams and based on the downlink beam measurements, a first number of measured downlink beams from a first TRP of the multiple TRPs and a second number of measured downlink beams from a second TRP of the multiple TRPs, and reporting, to the network node, a measured set of downlink beams including at least a portion of the first number of measured downlink beams and the second number of measured downlink beams to the network node, where the set of candidate beams is based on the measured set of downlink beams.

In Aspect 4, the method of Aspect 3 includes where performing the downlink beam measurements includes performing a downlink beam measurement of the at least one downlink beam combination, where the at least one downlink beam combination includes a first downlink beam from the first number of measured downlink beams and a second downlink beam from the second number of measured downlink beams.

In Aspect 5, the method of Aspect 4 includes where for the at least one downlink beam combination, the first downlink beam is received over a first UE antenna panel and the second downlink beam is received over a second UE antenna panel.

In Aspect 6, the method of any of Aspects 3 to 5 includes where the set of candidate downlink beams includes at least a single downlink beam from the first number of measured downlink beams or the second number of measured downlink beams.

In Aspect 7, the method of any of Aspects 1 to 6 includes where the set of candidate uplink beams is a subset of the candidate downlink beams.

In Aspect 8, the method of Aspect 7 includes where transmitting each candidate beam in the set of candidate uplink beams includes concurrently transmitting, for the at least one uplink beam combination in the set of candidate uplink beams, a first beam using a first UE antenna panel and a second beam using a second UE antenna panel.

In Aspect 9, the method of any of Aspects 1 to 8 includes transmitting multiple uplink beams including the at least one uplink beam combination as a first beam transmitted over a first antenna panel and a second beam transmitted over a second antenna panel, where the set of candidate uplink beams includes at least a portion of the multiple uplink beams.

In Aspect 10, the method of any of Aspects 1 to 9 includes where the set of candidate uplink beams includes the at least one uplink beam combination, where transmitting the at least one uplink beam combination as part of performing beam pair measurements includes concurrently transmitting a first uplink beam using a first UE antenna panel and transmitting a second uplink beam using a second UE antenna panel, and where performing the beam pair measurements includes performing a first measurement for a downlink beam in the set of candidate downlink beams with a first self-interference from transmitting the first uplink beam and performing a second measurement for the downlink beam with a second self-interference from transmitting the second uplink beam.

In Aspect 11, the method of any of Aspects 1 to 10 includes where the set of candidate downlink beams includes the at least one downlink beam combination of a first downlink beam received using a first UE antenna panel and a second downlink beam, concurrently received with the first downlink beam, using a second UE antenna panel, and where performing the beam pair measurements includes performing a first measurement for the first downlink beam with a self-interference from transmitting an uplink beam in the set of candidate uplink beams and an inter-beam interference from receiving the second downlink beam, and performing a second measurement for the second downlink beam with a self-interference from transmitting the uplink beam and an inter-beam interference from receiving the first downlink beam.

In Aspect 12, the method of any of Aspects 1 to 11 includes where the set of candidate uplink beams includes the at least one uplink beam combination, where transmitting the at least one uplink beam combination as part of performing beam pair measurements includes concurrently transmitting a first uplink beam using a first UE antenna panel and transmitting a second uplink beam using a second UE antenna panel, where the set of candidate downlink beams includes the at least one downlink beam combination of a first downlink beam received using a third UE antenna panel and a second downlink beam, concurrently received with the first downlink beam, using a fourth UE antenna panel, and where performing the beam pair measurements includes: performing a first measurement for the first downlink beam with an inter-beam interference from receiving the second downlink beam, a first self-interference from transmitting the first uplink beam, and a second self-interference from transmitting the second uplink beam, and performing a second measurement for the second downlink beam with an inter-beam interference from receiving the first downlink beam, a first self-interference from transmitting the first uplink beam, and a second self-interference from transmitting the second uplink beam.

Aspect 13 is a method for wireless communication at a network node including transmitting, to a UE, a first indication of a set of candidate downlink beams corresponding to multiple downlink beams transmitted from one or more TRPs, transmitting, to the UE, a second indication of a set of candidate uplink beams of multiple uplink beams, where at least one downlink beam in the set of candidate downlink beams includes a downlink beam combination of multiple downlink beams or at least one uplink beam in the set of candidate uplink beams includes an uplink beam combination of multiple uplink beams, transmitting, to the UE, each candidate downlink beam in the set of candidate downlink beams, and receiving, from the UE, a third indication of a set of candidate beam pairs based on receiving each candidate downlink beam in the set of candidate downlink beams while transmitting each candidate uplink beam in the set of candidate uplink beams.

In Aspect 14, the method of Aspect 13, includes selecting, based on measurements received for the set of candidate beam pairs, a beam pair in the set of candidate beam pairs for the UE to use in communicating with the one or more TRPs.

In Aspect 15, the method of Aspect 14 includes where selecting the beam pair is based on filtering out a subset of the set of candidate beam pairs having a downlink beam or beam combination that is transmitted using a same antenna panel.

In Aspect 16, the method of any of Aspects 14 or 15 includes transmitting, to the UE, a fourth indication of the beam pair.

In Aspect 17, the method of any of Aspects 13 to 16 includes transmitting the multiple downlink beams from TRPs, receiving, from the UE, a measured set of downlink beams including at least a portion of a first number of measured downlink beams from a first TRP of the multiple TRPs and a second number of measured downlink beams from a second TRP of the multiple TRPs, and selecting the set of candidate downlink beams based on the measured set of downlink beams.

In Aspect 18, the method of Aspect 17 includes where the at least one downlink beam combination includes a first downlink beam from the first number of measured downlink beams and a second downlink beam from the second number of measured downlink beams.

In Aspect 19, the method of any of Aspects 17 or 18 includes where the set of candidate downlink beams includes at least a single downlink beam from the first number of measured downlink beams or the second number of measured downlink beams.

In Aspect 20, the method of any of Aspect 13 to 19 includes selecting the set of candidate uplink beams as a subset of the set of candidate downlink beams.

In Aspect 21, the method of any of Aspects 13 to 20 includes receiving, from the UE, multiple uplink beams including the at least one uplink beam combination received as a first uplink beam and a second uplink beam concurrently transmitted by the UE, and selecting the set of candidate uplink beams as a subset of the multiple uplink beams.

In Aspect 22, the method of Aspect 21 includes where receiving the at least one uplink beam combination includes receiving, at the first TRP, the first uplink beam configured for channel measurement and the second uplink beam configured for interference measurement.

In Aspect 23, the method of Aspect 22 includes where receiving the at least one uplink beam combination includes receiving, at the second TRP, the second uplink beam configured for channel measurement and the first uplink beam configured for interference measurement.

In Aspect 24, the method of any of Aspects 13 to 23 includes where the set of candidate uplink beams includes the at least one uplink beam combination, and where the third indication includes, for each beam pair in the set of candidate beam pairs that include the at least one uplink beam combination a first measurement for a downlink beam in the beam pair with a first self-interference from transmitting a first uplink beam of the at least one uplink beam combination, and a second measurement for the downlink beam with a second self-interference from transmitting a second uplink beam of the at least one uplink beam combination.

In Aspect 25, the method of any of Aspects 13 to 24 includes where the set of candidate downlink beams includes the at least one downlink beam combination, and where the third indication includes, for each beam pair in the set of candidate beam pairs that include the at least one downlink beam combination a first measurement for a first downlink beam of the at least one downlink beam combination with a first self-interference from transmitting an uplink beam in the beam pair and an inter-beam interference from receiving a second downlink beam in the at least one downlink beam combination, and a second measurement for the second downlink beam with a self-interference from transmitting the uplink beam and an inter-beam interference from receiving the first downlink beam.

In Aspect 26, the method of any of Aspects 13 to 25 includes where the set of candidate uplink beams includes the at least one uplink beam combination, where the set of candidate downlink beams includes the at least one downlink beam combination, and where the third indication includes, for each beam pair in the set of candidate beam pairs that include the at least one downlink beam combination a first measurement for a first downlink beam of the at least one downlink beam combination with an inter-beam interference from receiving a second downlink beam of the at least one downlink beam combination, a first self-interference from transmitting a first uplink beam of the at least one uplink beam combination, and a second self-interference from transmitting a second uplink beam of the at least one uplink beam combination, and a second measurement for the second downlink beam with an inter-beam interference from receiving the first downlink beam, a first self-interference from transmitting the first uplink beam, and a second self-interference from transmitting the second uplink beam.

Aspect 27 is an apparatus for wireless communication including a processor, memory coupled with the processor, and instructions stored in the memory and operable, when executed by the processor, to cause the apparatus to perform any of the methods of Aspects 1 to 26.

Aspect 28 is an apparatus for wireless communication including means for performing any of the methods of Aspects 1 to 26.

Aspect 29 is a computer-readable medium including code executable by one or more processors for wireless communications, the code including code for performing any of the methods of Aspects 1 to 27.

The above detailed description set forth above in connection with the appended drawings describes examples and does not represent the only examples that may be implemented or that are within the scope of the claims. The term "example," when used in this description, means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and apparatuses are shown in block diagram form in order to avoid obscuring the concepts of the described examples.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, computer-executable code or instructions stored on a computer-readable medium, or any combination thereof.

The various illustrative blocks and components described in connection with the disclosure herein may be implemented or performed with a specially programmed device, such as but not limited to a processor, a digital signal processor (DSP), an ASIC, a field programmable gate array (FPGA) or other programmable logic device, a discrete gate or transistor logic, a discrete hardware component, or any combination thereof designed to perform the functions described herein. A specially programmed processor may be a microprocessor, but in the alternative, the processor may be any conventional processor, controller, microcontroller, or state machine. A specially programmed processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a non-transitory computer-readable medium. Other examples and implementations are within the scope and spirit of the disclosure and appended claims. For example, due to the nature of software, functions described above can be implemented using software executed by a specially programmed processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the common principles defined herein may be applied to other variations without departing from the spirit or scope of the disclosure. Furthermore, although elements of the described aspects and/or embodiments may be described or claimed in the singular, the plural is contemplated unless limitation to the singular is explicitly stated. Additionally, all or a portion of any aspect and/or embodiment may be utilized with all or a portion of any other aspect and/or embodiment, unless stated otherwise. Thus, the disclosure is not to be limited to the examples and designs described herein but is to be accorded the widest scope consistent with the principles and novel features disclosed herein.

What is claimed is:

1. An apparatus for wireless communication, comprising:
a processor;
memory coupled with the processor; and
instructions stored in the memory and operable, when executed by the processor, to cause the apparatus to:
receive, from a network node, a first indication of a set of candidate downlink beams corresponding to multiple downlink beams received from multiple transmit/receive points (TRPs) of the network node;
receive, from the network node, a second indication of a set of candidate uplink beams of multiple uplink beams, wherein at least one downlink beam in the set of candidate downlink beams includes a downlink beam combination of multiple downlink beams for concurrent transmission by the multiple TRPs or at least one uplink beam in the set of candidate uplink beams includes an uplink beam combination of multiple uplink beams for concurrent transmission by the apparatus;
perform beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams; and
report, to the network node, a third indication of the set of candidate beam pairs.

2. The apparatus of claim 1, wherein the instructions, when executed by the processor, further cause the apparatus to receive, from the network node, a fourth indication of a beam pair in the set of candidate beam pairs for use in communicating with the one or more of the multiple TRPs.

3. The apparatus of claim 1, wherein the instructions, when executed by the processor, further cause the apparatus to:
perform downlink beam measurements of the multiple downlink beams received from multiple TRPs;
select, from the multiple downlink beams and based on the downlink beam measurements, a first number of measured downlink beams from a first TRP of the multiple TRPs and a second number of measured downlink beams from a second TRP of the multiple TRPs; and
report, to the network node, a measured set of downlink beams including at least a portion of the first number of measured downlink beams and the second number of measured downlink beams to the network node, wherein the set of candidate beams is based on the measured set of downlink beams.

4. The apparatus of claim 3, wherein the instructions, when executed by the processor, cause the apparatus to perform a downlink beam measurement of the at least one downlink beam combination, wherein the at least one downlink beam combination includes a first downlink beam from the first number of measured downlink beams and a second downlink beam from the second number of measured downlink beams.

5. The apparatus of claim 4, wherein for the at least one downlink beam combination, the first downlink beam is received over a first UE antenna panel and the second downlink beam is received over a second UE antenna panel.

6. The apparatus of claim 3, wherein the set of candidate downlink beams includes at least a single downlink beam from the first number of measured downlink beams or the second number of measured downlink beams.

7. The apparatus of claim 1, wherein the set of candidate uplink beams is a subset of the candidate downlink beams.

8. The apparatus of claim 7, wherein the instructions, when executed by the processor, cause the apparatus to concurrently transmit, for the at least one uplink beam combination in the set of candidate uplink beams, a first beam using a first UE antenna panel and a second beam using a second UE antenna panel.

9. The apparatus of claim 1, wherein the instructions, when executed by the processor, further cause the apparatus to transmit multiple uplink beams including the at least one uplink beam combination as a first beam transmitted over a first antenna panel and a second beam transmitted over a second antenna panel, wherein the set of candidate uplink beams includes at least a portion of the multiple uplink beams.

10. The apparatus of claim 1, wherein the set of candidate uplink beams includes the at least one uplink beam combination, wherein the instructions, when executed by the processor, cause the apparatus to concurrently transmit a first uplink beam using a first UE antenna panel and transmit a second uplink beam using a second UE antenna panel, and
wherein the instructions, when executed by the processor, cause the apparatus to perform a first measurement for a downlink beam in the set of candidate downlink beams with a first self-interference from transmitting the first uplink beam and perform a second measurement for the downlink beam with a second self-interference from transmitting the second uplink beam.

11. The apparatus of claim 1, wherein the set of candidate downlink beams includes the at least one downlink beam combination of a first downlink beam received using a first UE antenna panel and a second downlink beam, concurrently received with the first downlink beam, using a second UE antenna panel, and
wherein the instructions, when executed by the processor, cause the apparatus to:
perform a first measurement for the first downlink beam with a self-interference from transmitting an uplink beam in the set of candidate uplink beams and an inter-beam interference from receiving the second downlink beam; and perform a second measurement for the second downlink beam with a self-interference from transmitting the uplink beam and an inter-beam interference from receiving the first downlink beam.

12. The apparatus of claim 1, wherein the set of candidate uplink beams includes the at least one uplink beam combination, wherein transmitting the at least one uplink beam combination as part of performing beam pair measurements includes concurrently transmitting a first uplink beam using a first UE antenna panel and transmitting a second uplink beam using a second UE antenna panel, wherein the set of candidate downlink beams includes the at least one downlink beam combination of a first downlink beam received using a third UE antenna panel and a second downlink beam, concurrently received with the first downlink beam, using a fourth UE antenna panel, and wherein the instructions, when executed by the processor, cause the apparatus to:

perform a first measurement for the first downlink beam with an inter-beam interference from receiving the second downlink beam, a first self-interference from transmitting the first uplink beam, and a second self-interference from transmitting the second uplink beam; and perform a second measurement for the second downlink beam with an inter-beam interference from receiving the first downlink beam, a first self-interference from transmitting the first uplink beam, and a second self-interference from transmitting the second uplink beam.

13. An apparatus for wireless communication, comprising:

a processor;

memory coupled with the processor; and instructions stored in the memory and operable, when executed by the processor, to cause the apparatus to:

transmit, to a user equipment (UE), a first indication of a set of candidate downlink beams corresponding to multiple downlink beams transmitted from multiple transmit/receive points (TRPs) of the apparatus;

transmit, to the UE, a second indication of a set of candidate uplink beams of multiple uplink beams, wherein at least one downlink beam in the set of candidate downlink beams includes a downlink beam combination of multiple downlink beams for concurrent transmission by the multiple TRPs or at least one uplink beam in the set of candidate uplink beams includes an uplink beam combination of multiple uplink beams for concurrent transmission by the UE;

transmit, to the UE, each candidate downlink beam in the set of candidate downlink beams; and receive, from the UE, a third indication of a set of candidate beam pairs based on receiving each candidate downlink beam in the set of candidate downlink beams while transmitting each candidate uplink beam in the set of candidate uplink beams.

14. The apparatus of claim 13, wherein the instructions, when executed by the processor, further cause the apparatus to select, based on measurements received for the set of candidate beam pairs, a beam pair in the set of candidate beam pairs for the UE to use in communicating with one or more of the multiple TRPs.

15. The apparatus of claim 14, wherein the instructions, when executed by the processor, cause the apparatus to select the beam pair based on filtering out a subset of the set of candidate beam pairs having a downlink beam or beam combination that is transmitted using a same antenna panel.

16. The apparatus of claim 14, wherein the instructions, when executed by the processor, further cause the apparatus to transmit, to the UE, a fourth indication of the beam pair.

17. The apparatus of claim 13, wherein the instructions, when executed by the processor, further cause the apparatus to:

transmit the multiple downlink beams from TRPs;

receive, from the UE, a measured set of downlink beams including at least a portion of a first number of measured downlink beams from a first TRP of the multiple TRPs and a second number of measured downlink beams from a second TRP of the multiple TRPs; and select the set of candidate downlink beams based on the measured set of downlink beams.

18. The apparatus of claim 17, wherein the at least one downlink beam combination includes a first downlink beam from the first number of measured downlink beams and a second downlink beam from the second number of measured downlink beams.

19. The apparatus of claim 17, wherein the set of candidate downlink beams includes at least a single downlink beam from the first number of measured downlink beams or the second number of measured downlink beams.

20. The apparatus of claim 13, wherein the instructions, when executed by the processor, further cause the apparatus to select the set of candidate uplink beams as a subset of the set of candidate downlink beams.

21. The apparatus of claim 13, wherein the instructions, when executed by the processor, further cause the apparatus to:

receive, from the UE, multiple uplink beams including the at least one uplink beam combination received as a first uplink beam and a second uplink beam concurrently transmitted by the UE; and select the set of candidate uplink beams as a subset of the multiple uplink beams.

22. The apparatus of claim 21, wherein the instructions, when executed by the processor, cause the apparatus to receive the at least one uplink beam combination at least in part by receiving, at a first TRP, the first uplink beam configured for channel measurement and the second uplink beam configured for interference measurement.

23. The apparatus of claim 22, wherein the instructions, when executed by the processor, cause the apparatus to receive the at least one uplink beam combination at least in part by receiving, at the second TRP, the second uplink beam configured for channel measurement and the first uplink beam configured for interference measurement.

24. The apparatus of claim 13, wherein the set of candidate uplink beams includes the at least one uplink beam combination, and wherein the third indication includes, for each beam pair in the set of candidate beam pairs that include the at least one uplink beam combination:

a first measurement for a downlink beam in the beam pair with a first self-interference from transmitting a first uplink beam of the at least one uplink beam combination; and a second measurement for the downlink beam with a second self-interference from transmitting a second uplink beam of the at least one uplink beam combination.

25. The apparatus of claim 13, wherein the set of candidate downlink beams includes the at least one downlink beam combination, and wherein the third indication includes, for each beam pair in the set of candidate beam pairs that include the at least one downlink beam combination:
- a first measurement for a first downlink beam of the at least one downlink beam combination with a first self-interference from transmitting an uplink beam in the beam pair and an inter-beam interference from receiving a second downlink beam in the at least one downlink beam combination; and
- a second measurement for the second downlink beam with a self-interference from transmitting the uplink beam and an inter-beam interference from receiving the first downlink beam.

26. The apparatus of claim 13, wherein the set of candidate uplink beams includes the at least one uplink beam combination, wherein the set of candidate downlink beams includes the at least one downlink beam combination, and wherein the third indication includes, for each beam pair in the set of candidate beam pairs that include the at least one downlink beam combination:
- a first measurement for a first downlink beam of the at least one downlink beam combination with:
  - an inter-beam interference from receiving a second downlink beam of the at least one downlink beam combination;
  - a first self-interference from transmitting a first uplink beam of the at least one uplink beam combination; and
  - a second self-interference from transmitting a second uplink beam of the at least one uplink beam combination; and
- a second measurement for the second downlink beam with:
  - an inter-beam interference from receiving the first downlink beam;
  - a first self-interference from transmitting the first uplink beam; and
  - a second self-interference from transmitting the second uplink beam.

27. A method for wireless communication at a user equipment (UE), comprising:
- receiving, from a network node, a first indication of a set of candidate downlink beams corresponding to multiple downlink beams received from multiple transmit/receive points (TRPs) of the network node;
- receiving, from the network node, a second indication of a set of candidate uplink beams of multiple uplink beams, wherein at least one downlink beam in the set of candidate downlink beams includes a downlink beam combination of multiple downlink beams for concurrent transmission by the multiple TRPs or at least one uplink beam in the set of candidate uplink beams includes an uplink beam combination of multiple uplink beams for concurrent transmission by the UE;
- performing beam pair measurements of each candidate downlink beam in the set of candidate downlink beams received while transmitting each candidate uplink beam in the set of candidate uplink beams to select a set of candidate beam pairs each including one of the candidate downlink beams and one of the candidate uplink beams; and
- reporting, to the network node, a third indication of the set of candidate beam pairs.

28. The method of claim 27, further comprising receiving, from the network node, a fourth indication of a beam pair in the set of candidate beam pairs for use in communicating with one or more of the multiple TRPs.

29. A method for wireless communication at a network node, comprising:
- transmitting, to a user equipment (UE), a first indication of a set of candidate downlink beams corresponding to multiple downlink beams transmitted from multiple transmit/receive points (TRPs) of the network node;
- transmitting, to the UE, a second indication of a set of candidate uplink beams of multiple uplink beams, wherein at least one downlink beam in the set of candidate downlink beams includes a downlink beam combination of multiple downlink beams for concurrent transmission by the multiple TRPs or at least one uplink beam in the set of candidate uplink beams includes an uplink beam combination of multiple uplink beams for concurrent transmission by the UE;
- transmitting, to the UE, each candidate downlink beam in the set of candidate downlink beams; and
- receiving, from the UE, a third indication of a set of candidate beam pairs based on receiving each candidate downlink beam in the set of candidate downlink beams while transmitting each candidate uplink beam in the set of candidate uplink beams.

30. The method of claim 29, further comprising selecting, based on measurements received for the set of candidate beam pairs, a beam pair in the set of candidate beam pairs for the UE to use in communicating with one or more of the multiple TRPs.

* * * * *